(12) United States Patent
Nitsche et al.

(10) Patent No.: US 8,342,749 B2
(45) Date of Patent: Jan. 1, 2013

(54) POSITIONING DEVICE FOR A STORAGE FILM AND STORAGE-FILM READER, STORAGE FILM CASSETTE AND STORAGE-FILM HANDLING DEVICE

(75) Inventors: Klaus Nitsche, Kirchheim/Neckar (DE); Ulrich Prager, Abstatt/Happenbach (DE); Michael Thoms, Bietigheim-Bissingen (DE)

(73) Assignee: Duerr Dental GmbH & Co. KG (DE)

( * ) Notice: Subject to any disclaimer, the term of this patent is extended or adjusted under 35 U.S.C. 154(b) by 564 days.

(21) Appl. No.: 12/088,217

(22) PCT Filed: Aug. 23, 2006

(86) PCT No.: PCT/EP2006/008263
§ 371 (c)(1), (2), (4) Date: Dec. 10, 2008

(87) PCT Pub. No.: WO2007/036271
PCT Pub. Date: Apr. 5, 2007

(65) Prior Publication Data
US 2009/0252299 A1    Oct. 8, 2009

(30) Foreign Application Priority Data
Sep. 27, 2005    (DE) .......................... 10 2005 046 314

(51) Int. Cl.
*G03B 42/04* (2006.01)

(52) U.S. Cl. ......... 378/184; 378/182; 378/187; 378/188

(58) Field of Classification Search ........... 378/182–188
See application file for complete search history.

(56) References Cited

U.S. PATENT DOCUMENTS

| | | | | |
|---|---|---|---|---|
| 4,889,233 A * | 12/1989 | Torii | ............................. | 206/455 |
| 5,441,251 A * | 8/1995 | Ohta | ............................. | 271/145 |
| 6,333,514 B1 * | 12/2001 | Koishikawa et al. | ......... | 250/588 |
| 6,365,909 B1 | 4/2002 | Hayakawa et al. | | |
| 6,534,779 B1 | 3/2003 | Kohda et al. | | |
| 2002/0148988 A1 | 10/2002 | Thoms | | |
| 2003/0128815 A1 | 7/2003 | Stahl et al. | | |
| 2003/0202636 A1 | 10/2003 | Thoms | | |
| 2005/0051447 A1 * | 3/2005 | Nakajo et al. | ................. | 206/455 |

FOREIGN PATENT DOCUMENTS

| | | |
|---|---|---|
| EP | 0919857 A2 | 6/1999 |
| EP | 1321804 | 6/2003 |
| JP | 2000-235239 A | 8/2000 |
| WO | 0118796 A1 | 3/2001 |

* cited by examiner

*Primary Examiner* — Hoon Song
*Assistant Examiner* — Mona M Sanei
(74) *Attorney, Agent, or Firm* — Factor Intellectual Property Law Group, Ltd.

(57) ABSTRACT

In order to prevent a storage film from being damaged when taking an X-ray image, when reading the latent X-ray image and when handling the storage film, the invention proposes providing spaced-apart guide parts on the rear face of the storage film, these guide parts not having an adverse effect on the ability of the film to bend. The guide parts interact with guide rails which are provide in a cassette which accommodates the storage film or on a film-clamping slide of a reader.

68 Claims, 17 Drawing Sheets

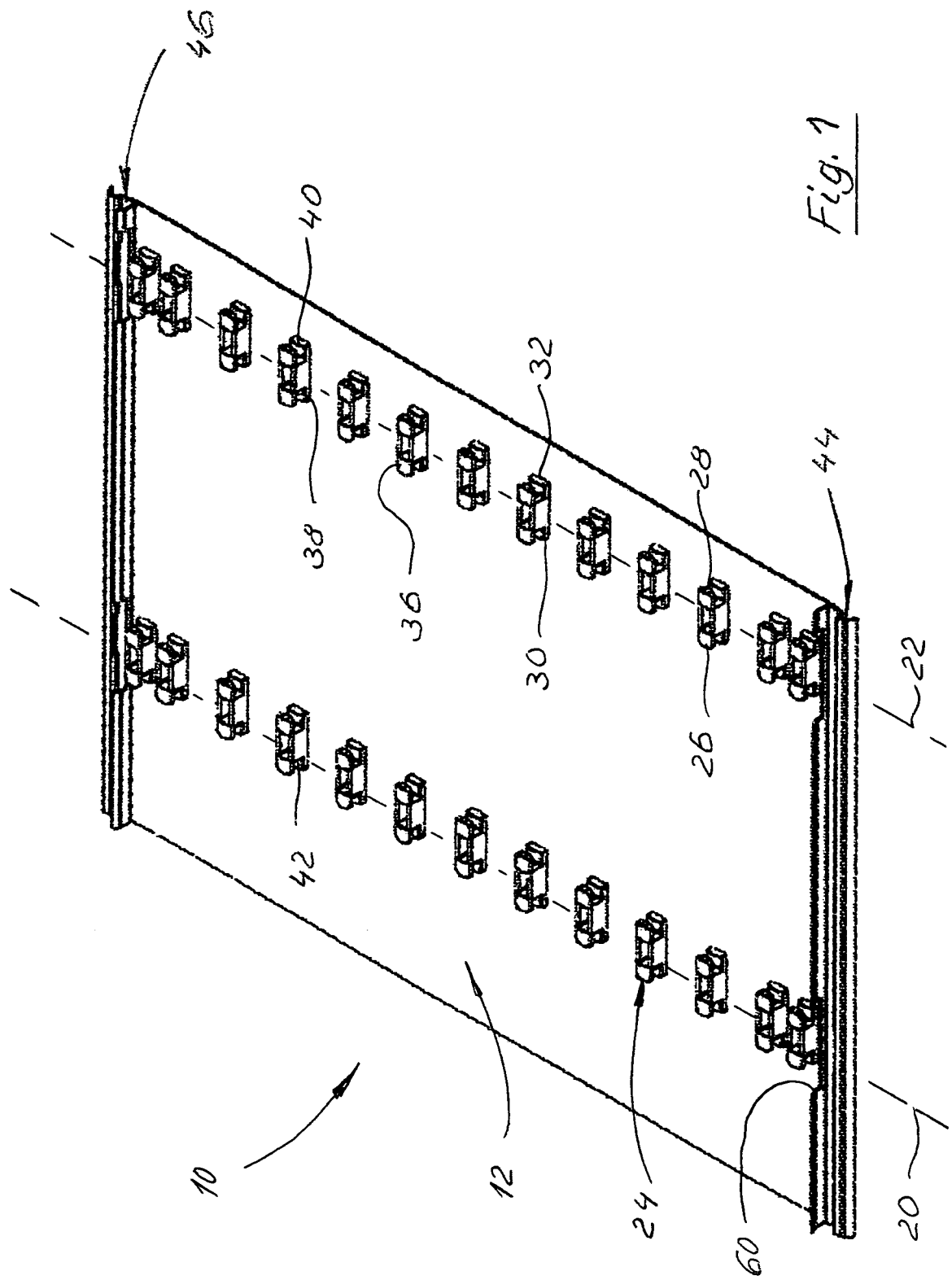

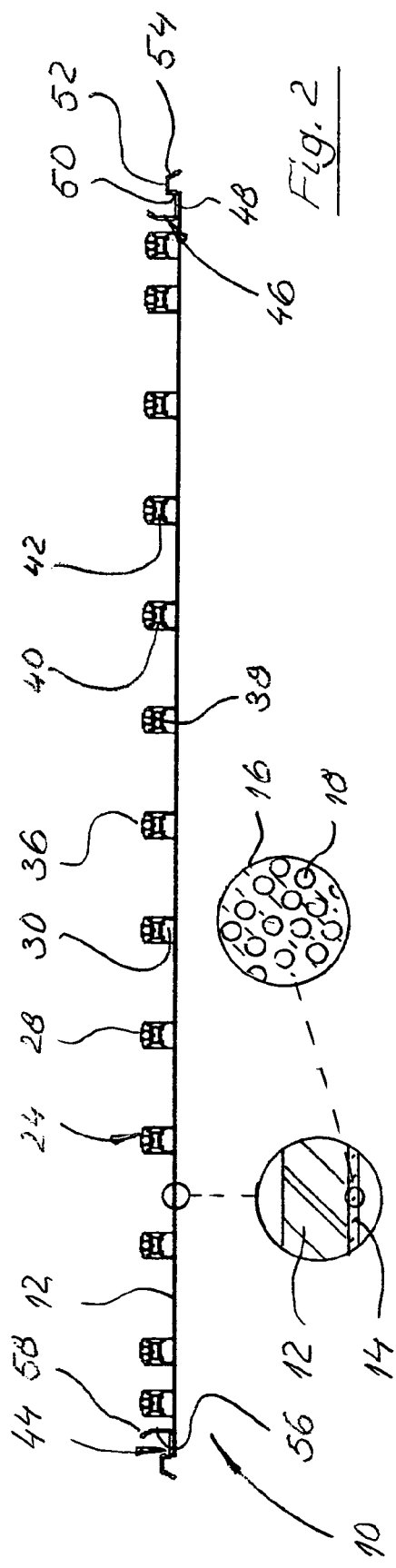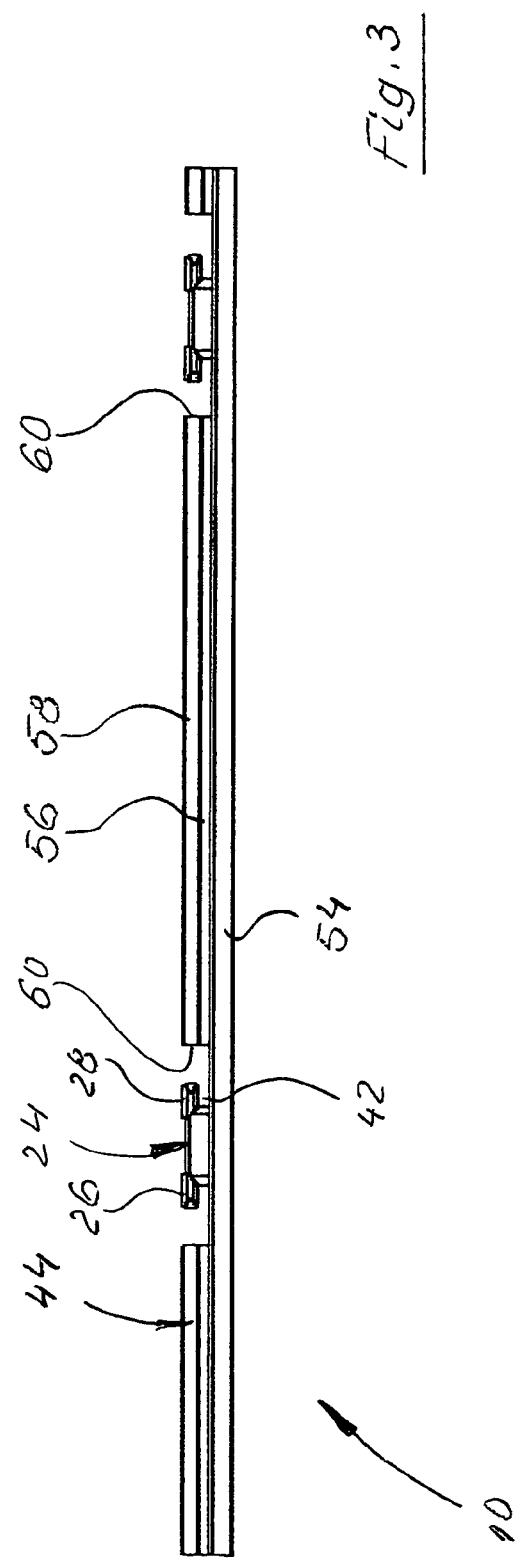

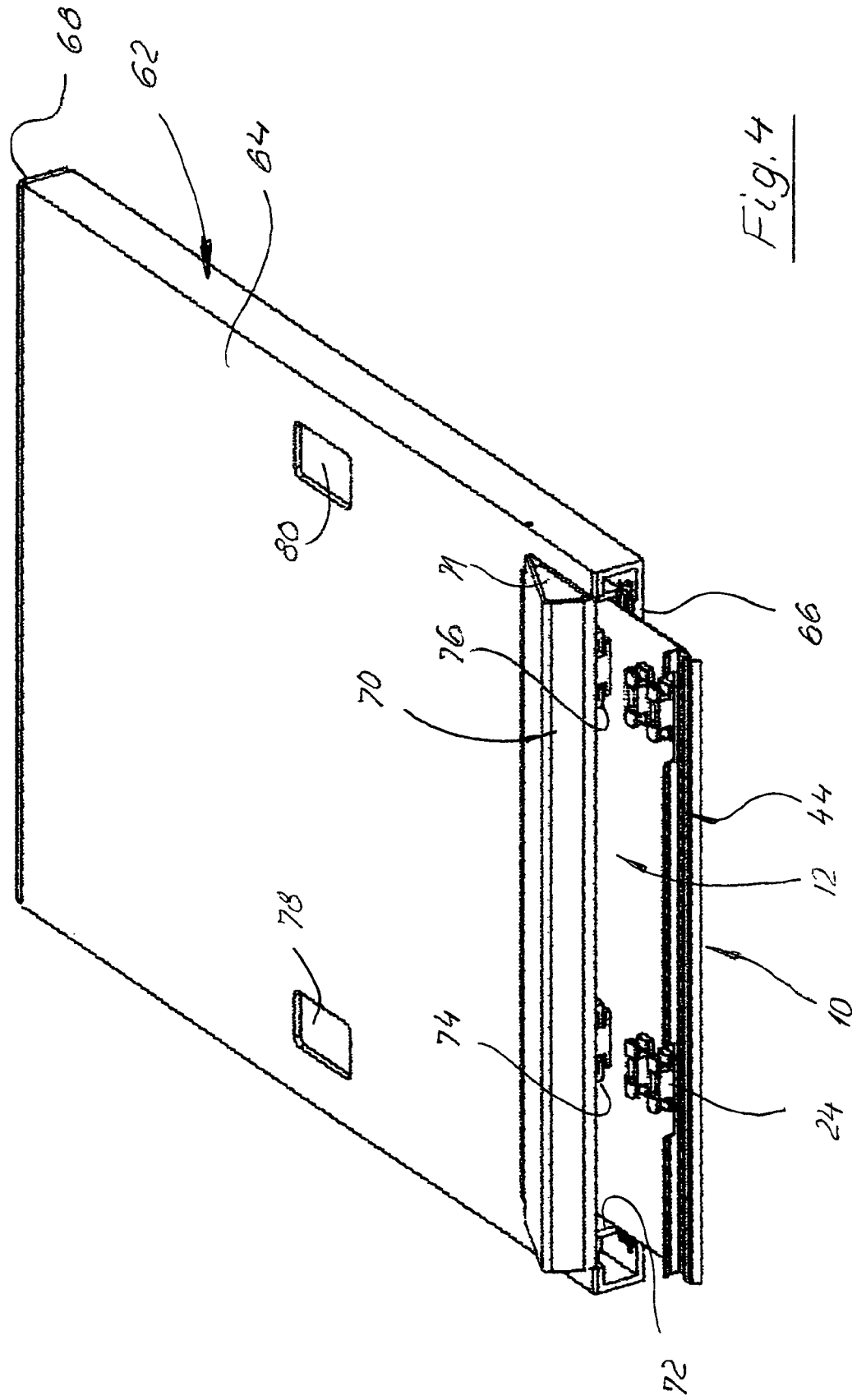

POSITIONING DEVICE FOR A STORAGE FILM AND STORAGE-FILM READER, STORAGE FILM CASSETTE AND STORAGE-FILM HANDLING DEVICE

RELATED APPLICATIONS

This application claims the filing benefit of PCT patent application No. PCT/EP2006/008263, filed Aug. 23, 2006; which claims the benefit of German Patent Application No. 10 2005 046 314.2, filed Sep. 27, 2005; the contents of all are incorporated herein by reference.

TECHNICAL FIELD

The invention relates to a positioning device for a storage film, a reading/film-clamping device using a positioning device of this kind, a film cassette using a positioning device of this kind and a film-handling device for moving a storage film between a film cassette of this kind and a reading/film-clamping device of this kind.

BACKGROUND OF THE INVENTION

In the various fields of human and veterinary medicine, but also in materials testing, storage films are increasingly being used instead of conventional X-ray films. These storage films contain, in a manner distributed in a thin light-sensitive coating (working coating), centres which pass over into a metastable excited state with a fairly long lifespan when excited by means of X-ray light.

A film of this kind which is exposed by means of irradiating X-ray light contains a latent image in the form of a locally smaller or larger number of excited storage centres, an item of information similar to an X-ray film which has not yet been developed. This item of information is read by scanning the exposed storage film with a laser beam of suitable wavelength (usually in the red range). At the particular point of the storage film which is affected, the laser beam excites storage centres which are in a metastable excited state into a still higher state, from which then relax while emitting fluorescent light. This fluorescent light is measured with a photodetector (generally a photomultiplier).

By recording the output signal of the photodetector in dependence upon the particular instantaneous position of the laser beam used for reading purposes, the latent X-ray image which has been formed by the excited storage centres is converted into an image printed out by electrical signals.

With a view to adequate absorption of X-rays, the density and atomic number of fine particles of a phosphoric material which contains the storage centres must be chosen so as to be sufficiently high. The concentration of the phosphoric particles should also be high.

When reading the X-ray image, the reproduction of the signals or the resolution will be adversely affected if there are additional centres of dispersion, in the form of non-uniformities or mechanical damage, in the light-sensitive coating. Attempts are therefore made to ensure that the light-sensitive coating is, as far as possible, optically isotropic.

Additional centres of dispersion can be imparted to a light-sensitive coating by incorrect handling. These comprise, in particular, scratches or stress marks on the surface of the light-sensitive coating. Since storage films are expensive, it is desirable to avoid such traces of use.

The present invention is directed to addressing these and other issues.

SUMMARY OF THE INVENTION

The present invention is concerned, in general, with the problem of how storage films can be handled in such a way that mechanical damage to the light-sensitive coating is avoided to the greatest possible extent.

This object may be achieved, according to the invention, by means of a storage-film positioning device having a working side that responds to electromagnetic radiation and a rear side, wherein said film is provided, along at least one guide line, with guide means which maintain the ability of the storage film to bend in an axis which is inclined in relation to said guide line and lies in the plane of the film, and that the guide means which are arranged on a guide line each cooperate with an elongated guide rail which is rigid, compared with the storage film.

The invention is also concerned with the way in which the formation of scratches on the surface of the film can be avoided in the phases involved in taking an X-ray image and the phases involved in reading it. To this end, the invention includes profiled strips having a stop section that acts in the direction of the guide lines and a film cassette including a clamping device that is displaceable along the axis of the reading head.

For avoiding damage to the surface of a film when transferring it from the cassette into the reader and vice versa, the present invention includes a film transfer device wherein the input part has a control face that cooperates with a follower part connected to an occluding flap.

In the case of the positioning device according to the invention, there are, for one thing, provided on the storage film itself guide parts which are arranged along a guide line. These guide parts are constructed in such a way that they do not affect, or affect only slightly, the ability of the storage film to bend in a direction, in particular a perpendicular direction, which is inclined in relation to the direction of guidance.

At least one guide rail, which has a high degree of stiffness compared to the storage film, is provided fixing the flexible storage film in a desired area (for reading or taking the X-ray image). Said guide rail thus impresses its geometry upon the storage film. Typical preferred geometries for the guide rail are rectilinear geometry and circular geometry. For special applications, however, other geometries can also be easily produced by shaping the guide rail in a suitable manner.

In principle, the guide means can be provided on the front side or rear side of the storage film, as long as they are located at the edge of the latter. They may also be arranged on the edge of the storage film in a manner projecting beyond said film.

The guide means are preferably located on the rear side, which is not light-sensitive, of the storage film, where they can be attached even at points which are remote from the edge. What is obtained in this way, bearing in mind the inherent stiffness of the storage film, is a very good approximation to the geometry of the light-sensitive coating over a desired ideal area (in particular a plane or cylinder), although only a few guide lines are provided (in practice, two spaced-apart guide lines are sufficient, even for the current medical formats [up to 30×40 cm or more]).

BRIEF DESCRIPTION OF THE DRAWINGS

FIG. 1: shows a perspective view of the rear side of a storage film which is provided, at that point, with rows of spaced-apart guide shoes along spaced-apart guide lines;

FIG. 2: shows a side view of the storage film according to FIG. 1;

FIG. 3: shows a front view of a storage film according to FIG. 1 (on an enlarged scale);

FIG. 4: shows a perspective view of a film cassette, viewed from the loading end of the latter, wherein a storage film is represented partly withdrawn from the interior of the magazine;

Figure 5:
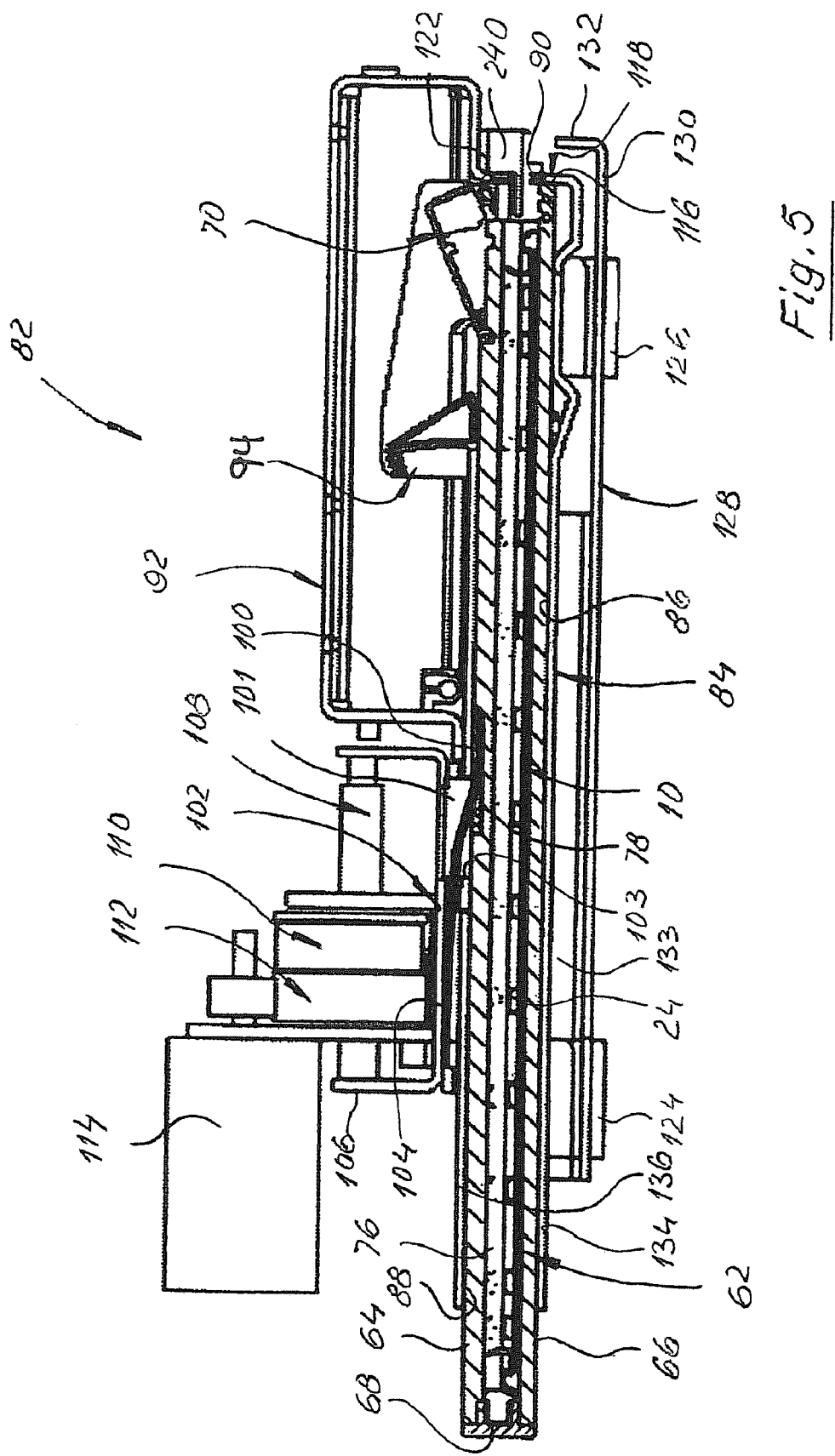
FIG. 5: shows a horizontal section through a cassette-receiving shaft of a storage-film reader.

In the drawings, cutaway areas are represented in shaded form only exceptionally. It is also possible, in this way, to see from the context where cutaway areas are located.

Positional and directional indications, such as "at the top", "at the bottom", "in front" and "behind" are used in some cases in the following description. Unless otherwise indicated, these relate to the particular figure or conveying step under consideration.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

In FIGS. 1 to 3, a storage film is designated, as a whole, by 10. It comprises a bendable, inherently stiff substrate 12 having a typical thickness of 0.5 to 0.8 mm, and also a light-sensitive working coating 14 carried by said substrate and having a typical thickness of 0.1 to 0.2 mm.

The working coating 14 consists of a transparent matrix 16 and phosphorus particles 18 densely distributed in the latter, which may consist, for example, of an alkaline-earth or alkali-halide mixed-crystal material with a doping of rare earths such as Eu.

In one type of storage films, the overall combination of materials of the matric and phosphoric particles in working coating 14 is chosen in such a way that the latter is largely devoid of internal optical boundary faces which might lead to dispersions of light.

In another, conventional type of storage films, the working coating contains homogeneously distributed internal boundary faces with the result that the resolution achieved lags behind that which is possible, per se, as regards the laser beam.

On the rear side of the storage film 10, guide parts 24 are arranged along two guide lines 20, 22.

These are of substantially double-T-shaped construction with two guide arms 26, 28 at the upper end and two fastening arms 30, 32 at the lower end. The central body of the guide part 24 is constructed as a hollow box part, which is open towards the top and closed at the bottom by a base, the underside of which forms, with the underside of the fastening arms 30, 32, a continuous fastening face.

As can be seen from the drawings, the two guide parts 24 positioned at the ends are provided at a distance which amounts to half the distance between inner guide parts 24.

The guide parts 24 are bonded, by their lower fastening faces, to the rear side of the substrate in such a way that their guide arms 26, 28 extend perpendicularly on the guide lines 20, 22 and parallel to the plane of the film.

Figure 10:
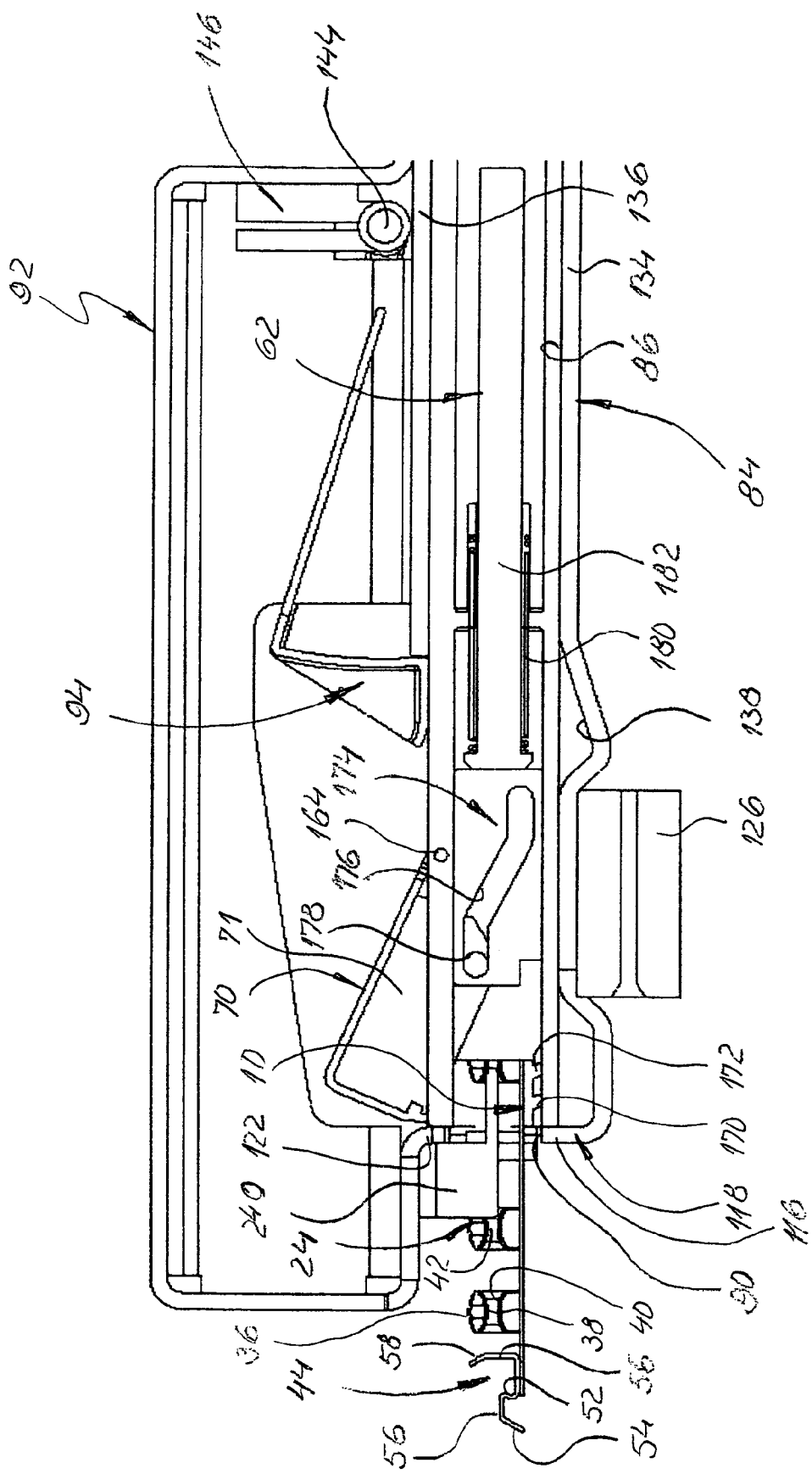
FIG. 10: shows a view similar to FIG. 9, wherein a storage film is represented in a position which it assumes in a first phase of withdrawal from the cassette.

As can be seen from FIGS. 2 and 3, but also particularly from FIG. 10, the guide arms 26, 28 each have a convex upper side 36 and a convex lower side 38, and the upper side 40 of the fastening arms 30, 32 is likewise of convex construction, so that a passage 42, which is formed between the fastening arms 30, 32 and the guide arms 26, 28 in each case, widens towards both ends.

The marginal contour of the ends of the guide arms is rounded off, viewed perpendicularly to the plane of the film.

At its end edges which are positioned perpendicularly on the guide lines 20, 22, the substrate 12 carries two profiled rails 44, 46 which, on the one hand, serve for stiffening the film and, on the other hand, permit a force-locking connection to a gripper, as will be described again in more detail below.

As can be seen particularly from FIG. 2, the profiled rails 44, 46 each have a flat base section 48 which is bonded to the rear side of the substrate 12. Adjoining the base section 48 towards the outside, is a sidepiece 50 which is slightly inclined in relation to the perpendicular and onto the upper end of which is formed a sidepiece 52 which is parallel to the rear side of the substrate 12. Suspended from said sidepiece 52 is a sidepiece 54 which runs back, again in an obliquely inclined manner, and serves as a gripper run-up ramp.

Running substantially perpendicularly upwards away from the right-hand end of the base section 48 is a sidepiece 56 which serves, together with an end section 58 of said sidepiece that extends obliquely upwards towards the left in FIG.

2, as a stop for a gripper which serves to move the storage film, as will be explained again in more detail later on.

Each sidepiece 56 with its end section 58 has, in the continuation of the guide parts 24, marginal recesses 60 which extend almost as far as the lower end of said sidepiece 56. A guide rail, which cooperates with the guide parts 24 is able to pass, with clearance, through a marginal recess 60 in each case, as will be described again in more detail later.

The profiled rails 44, 46 are rolled sheet-metal bending parts or extruded profiles. Typical materials for the substrate 12 are bendable plastics with good adhesion of the matrix 16. Typical materials for the guide parts 24, which guarantee that said guide parts 24 move into matching, preferably metalic, guide rails with little friction, are PA6 and PBT for example.

FIG. 4 shows a cassette 62 in which a storage film 10 can be received. Said cassette has a main wall 64, which is the upper main wall in FIG. 4, and also a lower main wall 66 which lies opposite said upper main wall in a parallel manner. These walls form a hollow profile with a thin rectangular cross-section which is occluded at the rear end of the cassette by a lid 68.

At the loading end, which is the opposite end from the lid 68 and the lower end in FIG. 4, the cassette 62 can be occluded by an occluding flap 70 which is formed by an L-shaped profile whose long sidepiece constitutes a flush continuation of the upper main wall 64 and whose short sidepiece forms the front narrow side of the cassette 62, when the occluding flap is in a closing position. The L-profile is closed off at the ends by flush end walls 71.

In FIG. 4, the occluding flap 70 is represented in an open position in which a storage film 10 can be moved into the cassette and out of the latter via a loading aperture 72 in the cassette.

In order to prevent the sensitive working coating 14 of the storage film 10 from coming into contact with the inside of the lower main wall 66, two guide rails 74, 76, which have a rectangularly C-shaped cross-section, are attached on the underside of the upper main wall 64. The inner space of the guide rails 74, 76 is complementary to the clear profile of the guide arms 26, 28, the whole arrangement being such that the upper ends of the guide parts 24 can be moved within the guide rails 74, 76 with close sliding clearance.

The height of the cassette 62 is so dimensioned that the working coating 14 of the storage film 10 runs at a safe distance above the upper side of the lower main wall 66.

Provided in the upper side of the upper main wall 64 are two shallow depressions 78, 80 which can be acted upon by a thin thrust member in order to be able to move the cassette within a cassette-receiving shaft, as will be described again in more detail later on.

As can be seen from FIG. 4, the cassette 62 is wider than the storage film 10, so that space is still left for accommodating a mechanism which serves for moving the occluding flap 70 between the open position represented in the drawings and a position in which it is retracted in a flush manner into the clear contour of the cassette 62. This mechanism will be described again in more detail later.

In order to be able to take the storage film 10 out of the cassette 62 and introduce it into the latter again without human intervention, use may be made of the transfer unit, which is shown in FIG. 5 and is designated, as a whole, by 82, together with a gripper unit which will be described later.

The transfer unit 82 has a cassette-receiving shaft 84 which is produced from sheet-metal parts and whose inner faces delimit a cassette-receiving compartment 86. Said compartment is open at the end which is located on the left in FIG. 5, and forms a cassette-loading aperture 88.

A film-loading aperture 90 is constructed in the opposite end, which is located on the right in FIG. 5, of the cassette-receiving shaft 84.

Said cassette-receiving shaft 84 is carried by means of a hollow profile 92 which is angled a number of times and carries various mechanical parts which serve to open the occluding flap 70 when a cassette 62 is inserted and also to receive and mount strip-shaped covering members 94, 96, 98 which serve to close off the cassette-receiving compartment 86 in a light-tight manner if the cross-section of the latter is not filled up by a cassette 62.

Figure 11:
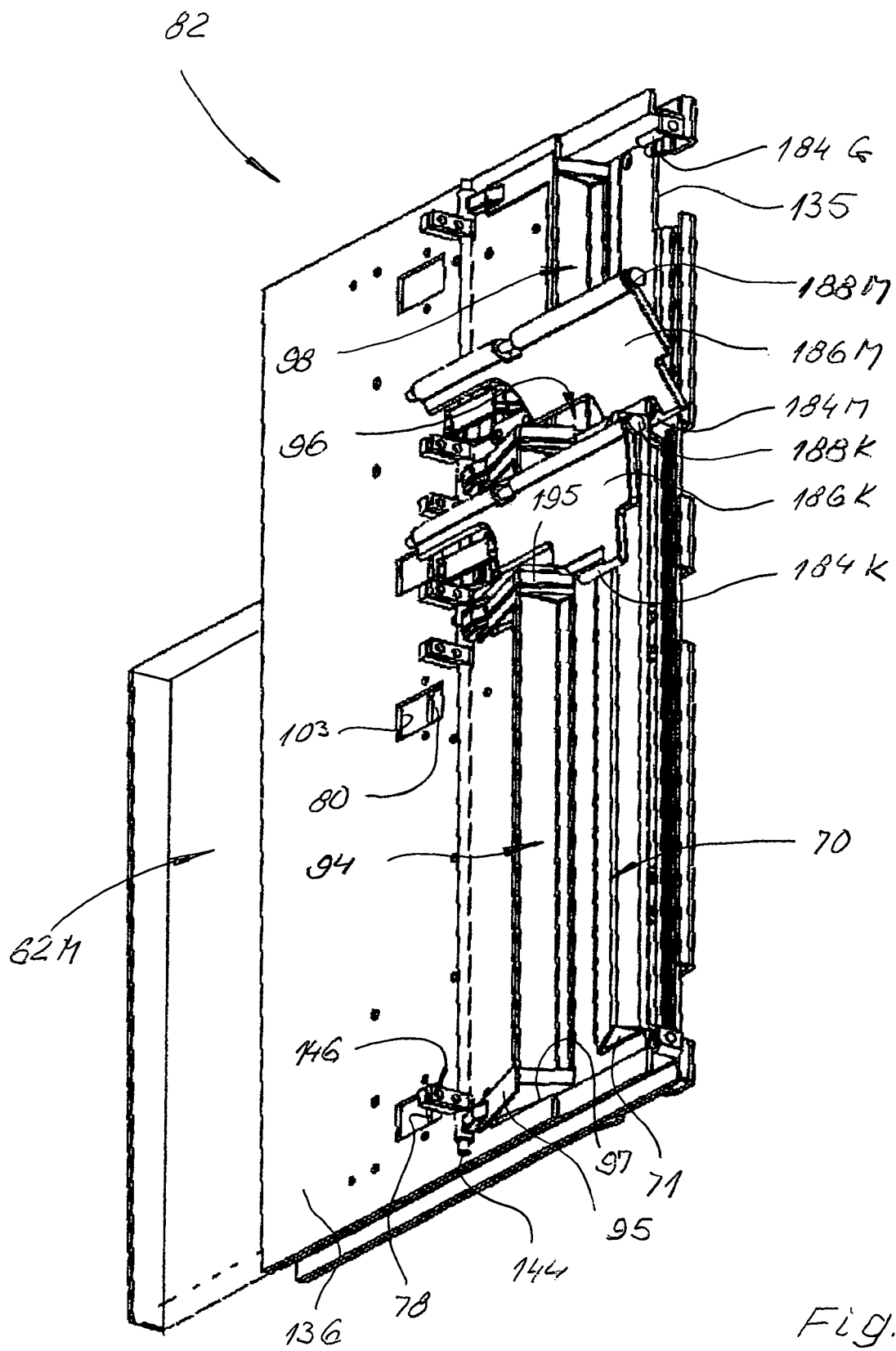
FIG. 11: shows a side view of the receiving shaft, with the cover of said shaft removed, in which the mechanism for adjusting different covering members is represented in a position such as it will have assumed after the insertion of a medium-sized cassette.
Figure 12:
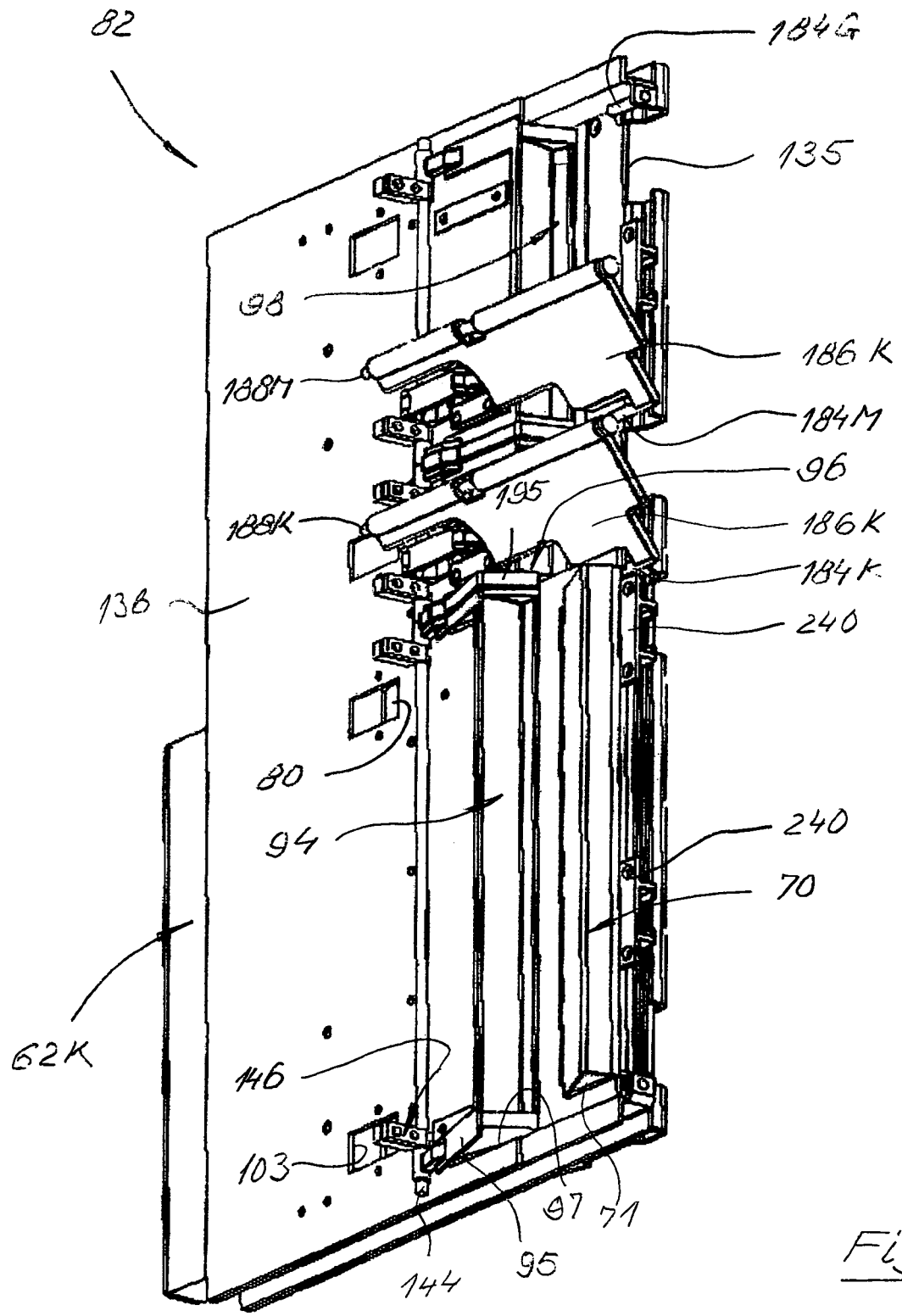
FIG. 12: shows a view similar to FIG. 11, but wherein a small cassette has been inserted in the receiving shaft.
Figure 13:
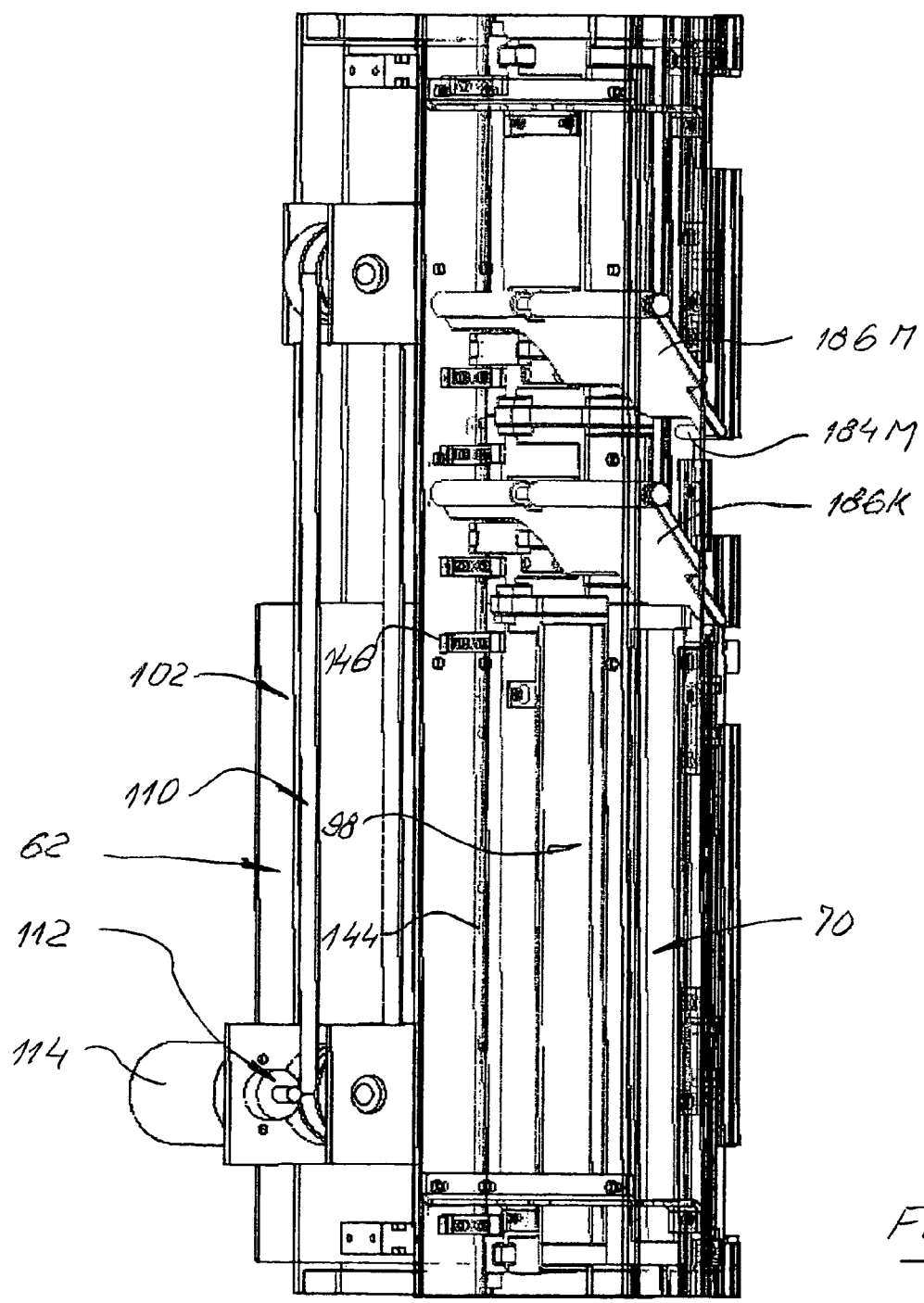
FIG. 13: shows a perspective view of the mechanism of the cassette-receiving shaft, viewed from the outside and the reading-head side of said receiving shaft.

As is shown in FIGS. 11 and 12, the covering members 94, 96, 98 have, at one end (in the case of the covering members 96, 98) or at both ends (in the case of the covering member 94), covering flanges 95 by means of which they are able to mask an adjacent covering member or an edge of the aperture in a main wall 136 of the shaft through which they pass in. Thus, the unwanted entrance of light is prevented at these points.

Particulars of these parts of the transfer device will be described again in more detail later.

In FIG. 5, 100 designates flexible driving tongues which lie at a distance one behind the other, in a manner perpendicular to the plane of the drawing, and are manufactured from a leaf-spring-like material, that is to say combine a certain flexural stiffness with flexibility. These driving tongues 100 have only a low thickness, so that they can be introduced into the depressions 78, 30 in a manner lying flat against the bottoms of said depressions, and their upper side then does not project above the upper side of the cassette.

The driving tongues 100 are capable, in a manner guided by a slit in a guide part 101, of assuming a geometry which can be loaded in shear, their driving end, which cooperates with the depressions 78 and 80 respectively, lying in a plane which is offset downwards in a parallel manner, compared to the driven end which is the left-hand end in FIG. 5.

In this way, they can pass in through windows 103 in the upper wall of the cassette-receiving shaft 84.

Three driving tongues 100 are carried by an angled driving strip 102 which extends perpendicularly to the plane of the drawing in FIG. 5 and has an angle 104, which is the lower angle in FIG. 5 and is parallel to the plane of the cassette, and a sidepiece 106 which is vertical in FIG. 5 and is positioned perpendicularly on the plane of the cassette. The sidepiece last mentioned is connected, via a threaded drive which is merely shown diagrammatically at 108, a toothed-belt drive 110 and a pinion drive 112, to the output shaft of an electric motor 114 which is carried by the frame of the transfer unit 82.

It is thus possible, by energising the electric motor 114, to move the driving tongues 100 in such a way that they act upon that side wall of the depressions 78, 80 which is located on the right in FIG. 5, and are then moved further towards the right and thus move the cassette towards the right in FIG. 5, until the end wall of said cassette impinges on an end wall 118 of the housing of the cassette-receiving shaft 84.

The end wall 118 of the housing is formed by a turned-up end section 116 of a lower main wall 134 of the shaft 84 and by a hanging-down end section 122 of the profiled part 92.

The mutually opposed free edges of the end sections 116 and 122 delimit that film-loading aperture 90 of the transfer unit 82 which is in alignment with that of the loading aperture of the cassette 62 and through which a storage film can thus be passed, likewise without contact, if it is moved within the plane preset by the guide rails 74, 76.

Attached, via guide blocks 124, 126 which each have a guide slit which is chaliced open at the ends, to that housing wall 134 of the cassette-receiving shaft 84 which lies at the bottom in FIG. 5, is an elongated stop clip 128 which has a long sidepiece 130, which is parallel to the plane of the cassette, and also a number of short sidepieces 132 which lie close to that end of the receiving shaft which is located on the right in FIG. 5, and are spaced apart perpendicularly to the plane of the drawing.

The stop clip 128 is connected to the driving strip 102, via vertical sidepieces 133 on the latter, for synchronous movement.

If the driving tongues 100 are fully extended, the sidepieces 132 are to the right of the housing wall 118. If the driving tongues 100 are conveyed all the way back (this position is brought about by a control unit for the electric motor 114 when a cassette is to be inserted or removed), the sidepieces 132 forming stops are retracted into marginal recesses 135, which are visible in FIGS. 11 and 12, in the main wall 134 of the receiving shaft 84.

They then preset a stop for a cassette 62, which stop lies in front of the housing wall 118 and compulsorily brings the cassette to a stop at a point at which a mechanism for opening the occluding flap 70, which mechanism will be described again later and operates in a travel-dependent manner, has not yet begun to operate.

The opening of the occluding flap 70 can thus be initiated only by a control unit, through the fact that, via corresponding activation of the electric motor 114, said control unit moves the stop clip 128, synchronously with the driving tongues 100 when the latter are pushed forwards, into a non-active position located to the right of the housing wall 118. The danger of an erroneous entry of light, which is caused manually by accident, into the cassette 62 is thus avoided.

Figure 14:
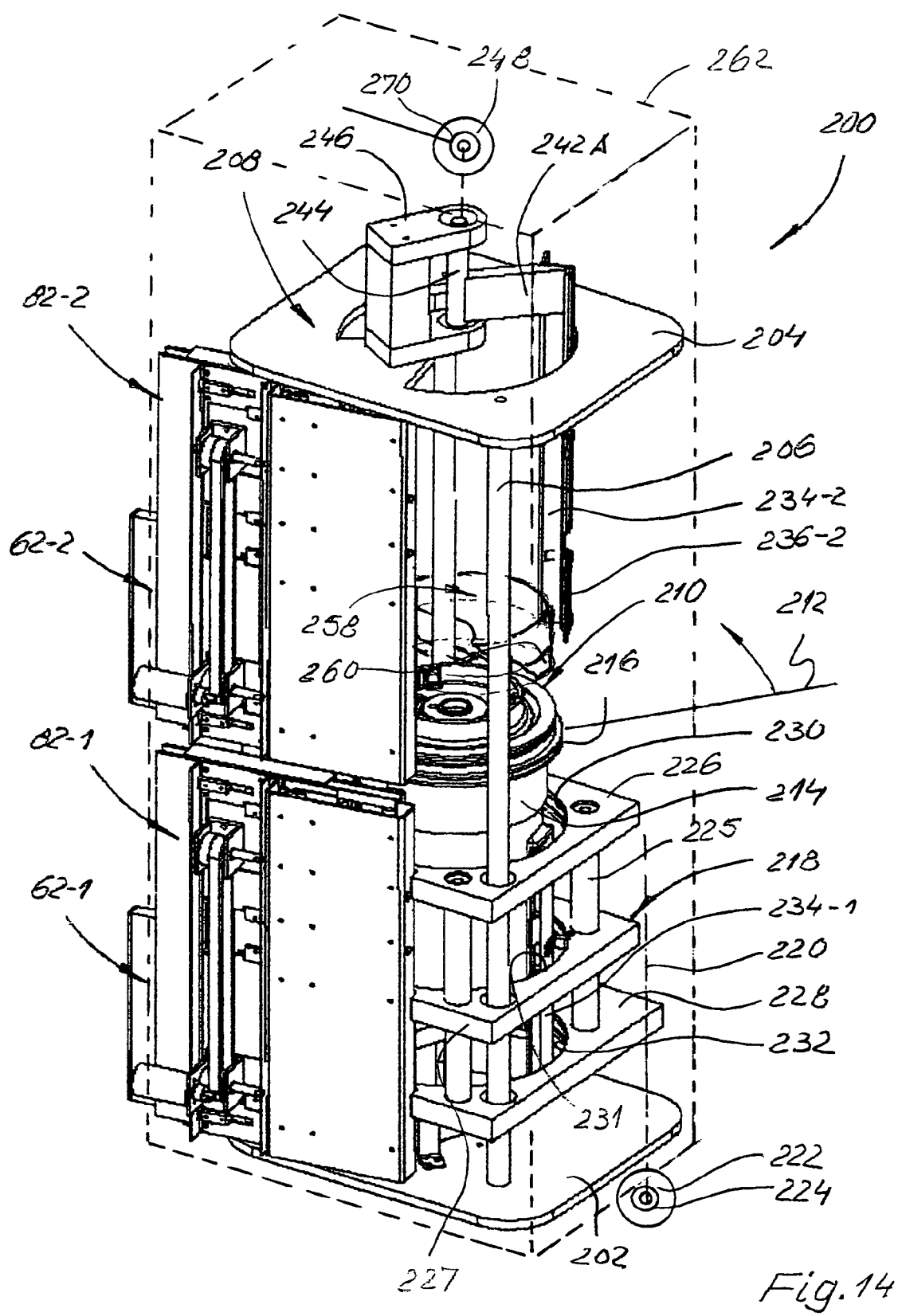
FIG. 14: shows a perspective view of a storage-film reader which has two cassette-receiving shafts.

FIGS. 6 to 10 show sections, which are likewise located perpendicularly to the plane of the cassette, through part of the transfer device according to FIG. 5, the direction of viewing being reversed however (the reversal of "upwards" and "downwards" when referring to FIG. 14).

Figure 6:
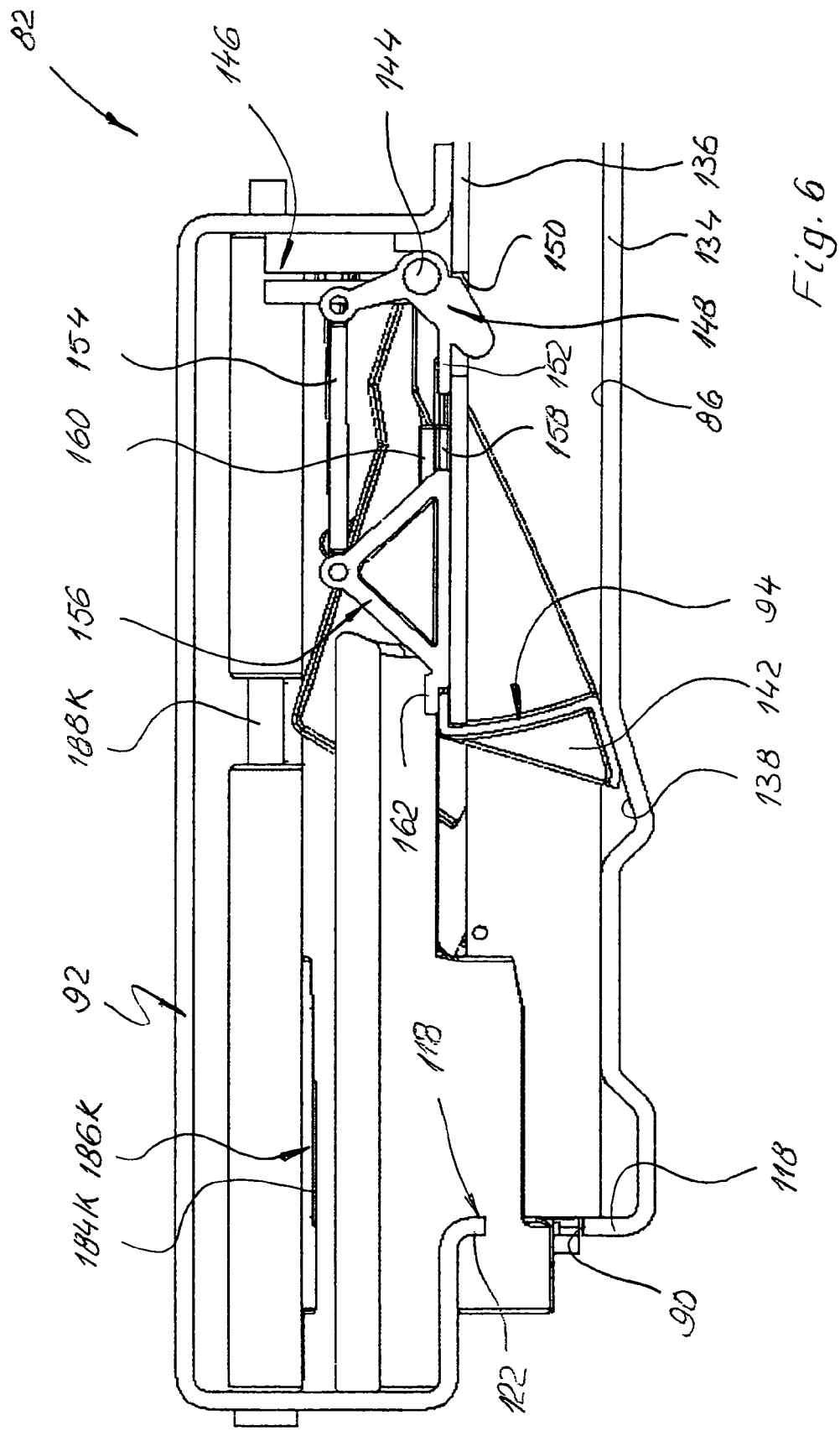
FIG. 6: shows a horizontal section through the removal section of the receiving shaft shown in FIG. 5, in the reverse direction of viewing and shown without a cassette, wherein said receiving shaft is occluded by a covering member.

FIG. 6 shows that end of the transfer unit 82 which is adjacent to the film-loading aperture 90. It is possible to make out more clearly that end wall 118 of the housing in which the film-loading aperture 90 is provided.

The two main walls of the cassette-receiving shaft 84 are designated by 134 and 136.

Constructed in the main wall 134, which is the lower main wall in FIG. 6, is a depression 138 which has the cross-section of an obtuse-angled, non-isosceles triangle.

The lower end of the covering member 94 is retracted into the depression 138 when the cassette-receiving compartment 86 is empty, as represented in FIG. 6. Said covering member has the shape of a Z-shaped profiled rail, which is carried, at its ends, by levers 142 which are mounted on a spindle 144 which is mounted, in a manner integral with the frame, via gripping blocks which are designated, as a whole, by 146.

The main wall 136, which is the upper main wall in FIG. 5, terminates behind the rear side of the arcuate rear section of the strip of the covering member 94, so that the latter can be raised, even by means of its lower sidepiece, in such a way that its underside constitutes a smooth continuation of the underside of the main wall 136. This raising of the covering member 94 takes place as a result of the cooperation of the front side of a cassette, which is inserted from the right, with the edges of the levers 142, which edges slope down obliquely.

Before the front side of the cassette comes into engagement with the levers 142, it actuates another positioning lever 148 which is likewise mounted on the spindle 144. Said positioning lever 148 projects through an aperture 150 in the upper main wall 136 into the cassette-receiving compartment 84 and into the path of the cassette. In order to occlude the aperture 150 when the cassette receptacle is empty, a suitable covering plate 152 is formed onto the positioning lever 148.

Said positioning lever 148 is a two-armed lever and acts, via a guide rod 154 which is connected in an articulated manner, upon a bolt which is designated, as a whole, by 156 and interacts with lateral guide ribs in guide grooves 158 in a bolt guide 160 which is integral with the housing.

The bolt 156 is constructed as a triangular framework and has, at its end which is located on the left in FIG. 6, a cranked bolt section 162 which is capable of engaging over the sidepiece, which is the upper sidepiece in FIG. 6, of the strip of the covering member 94. In this way, the covering member 94 is locked in its closing position as long as no section of a cassette is located close to it.

Figure 7:
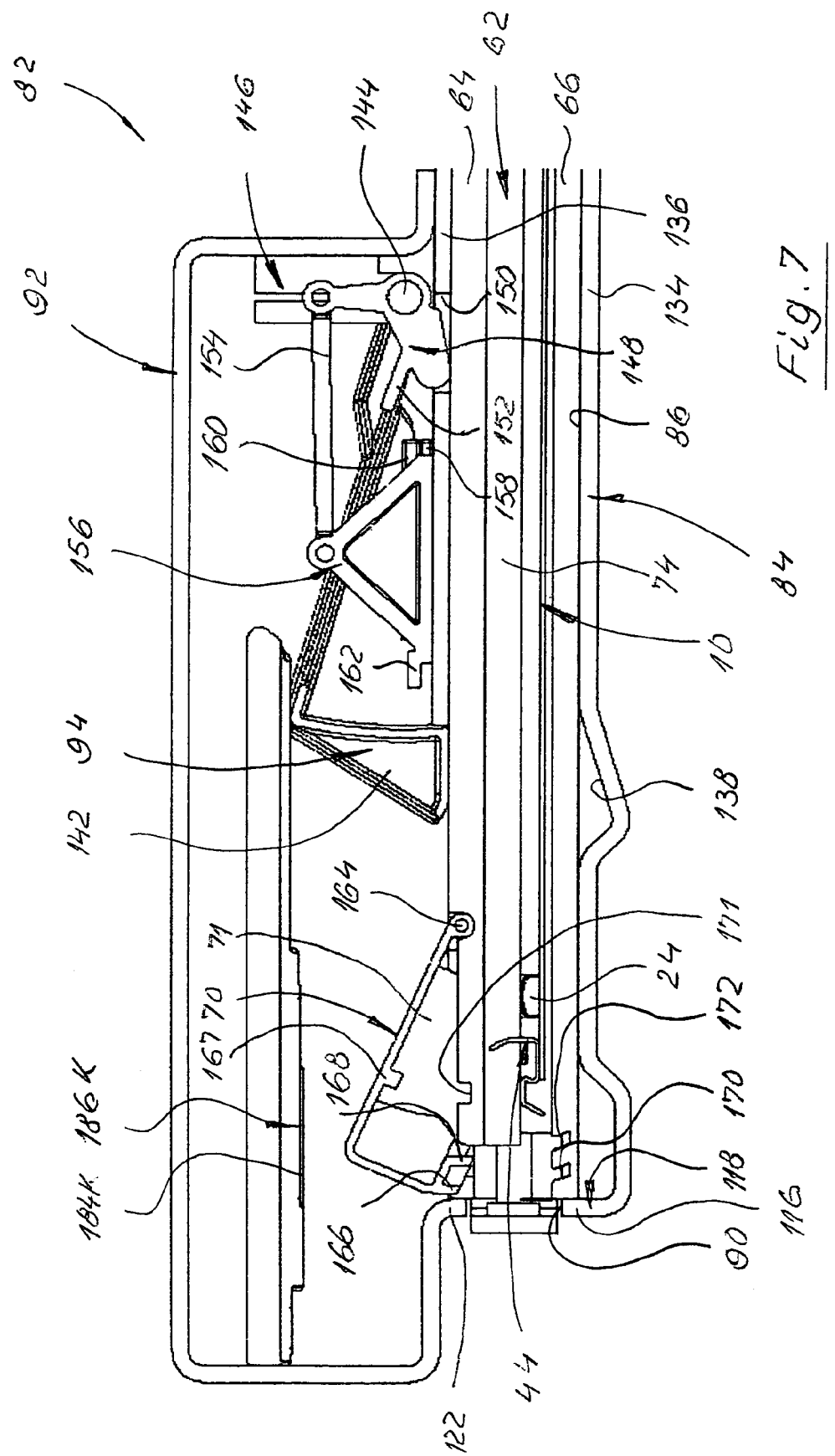
FIG. 7: shows a view similar to FIG. 6, wherein there has now been introduced into the receiving shaft a cassette which has moved the covering member into an open position and whose occluding flap has been moved into an open position.

FIG. 7 shows the same section through the transfer unit 82 at a point in time at which a cassette 82 is fully introduced into the cassette-receiving compartment 86, so that its left-hand end face strikes against the housing wall 118. In the course of this movement, the covering member 94 was first of all released as a result of the turning-outwards of the positioning lever 148, then said covering member was moved upwards, as a result of the cooperation of the lower edge of the lever 142 with the front side of the cassette 82, until it reached the open position represented in FIG. 7, in which the lower sidepiece of the profiled strip constitutes a continuation of the upper main wall 136.

FIG. 7 also shows, diagrammatically, another storage film 10 with its left-hand profiled rail 44 and one of the guide parts 24.

In order to obtain satisfactory sealing against ambient light at the loading end of the cassette 62, the underside of the occluding flap 70 carries two sealing ribs 166, 168 which are concentric with the swivel pin 164 of the occluding flap and cooperate with complementary sealing grooves 170, 172 which are likewise concentric with, or tangential to, said swivel pin 164 and are constructed in the lower main wall 66 of the cassette 62.

Another sealing rib 167 may be provided on the underside of the occluding flap 70 and cooperate with a sealing groove 171 in the upper side of the main wall 64 of the cassette in order to form an optical labyrinth seal.

The mechanism for compulsorily opening the occluding flap 70 in the last phase of the inserting movement will now be described with reference to FIG. 8.

A control member 174, which is provided with a downwardly-sloping control groove 176, is displaceably mounted in the cassette 82, close to one side of the latter. Said control groove 176 cooperates with a follower pin 178 which is carried by one of the side walls 71 of the occluding flap 70.

Figure 8:
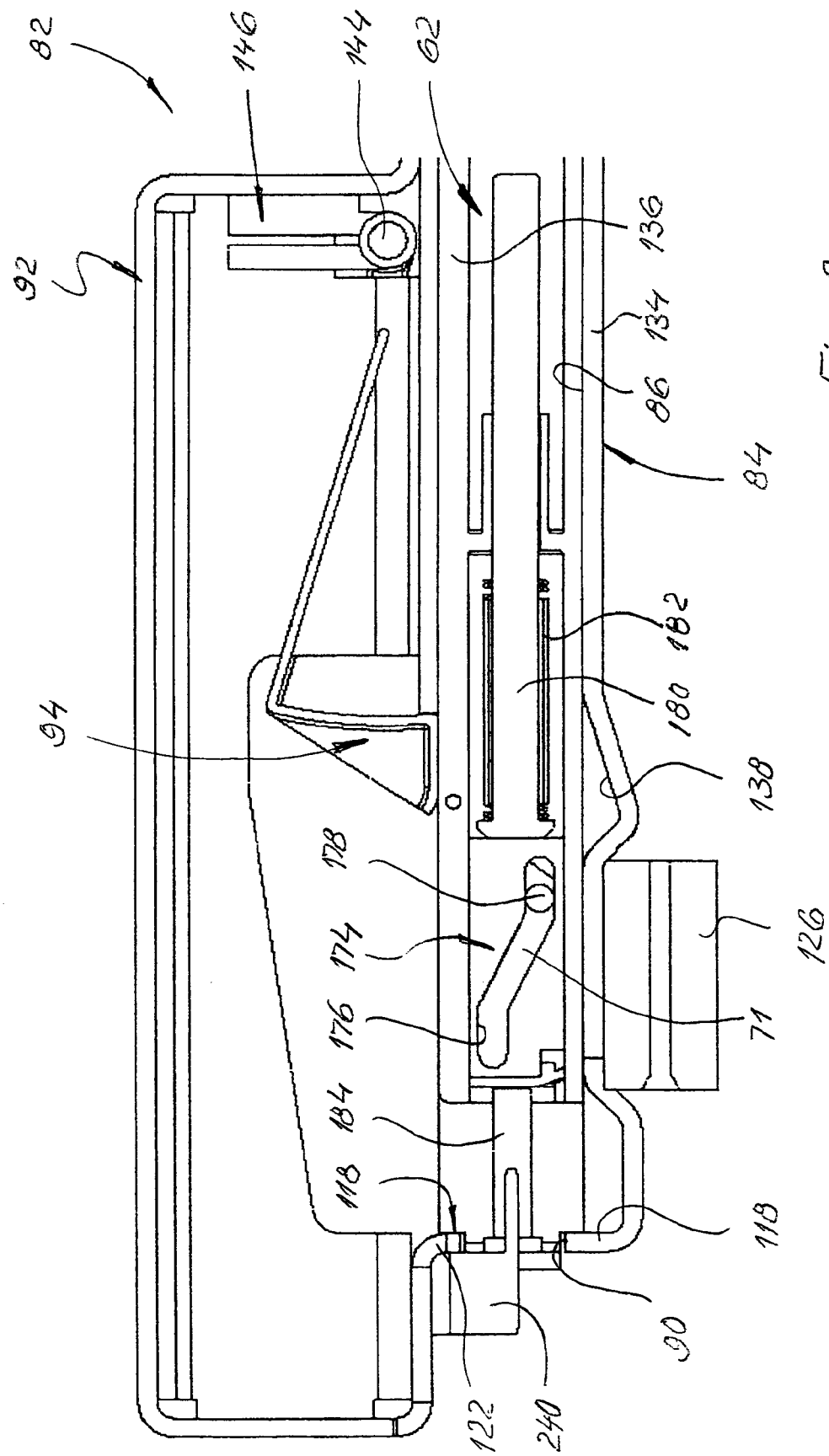
FIG. 8: shows a view similar to FIG. 7, in which an occluding-flap-actuating mechanism is shown in that position which it assumes shortly before the end of the insertion travel of the cassette.

In FIG. 8, the control member 174 is pretensioned towards the left by a spring 180 which acts upon a plunger 182 mounted in the cassette housing.

If said control member 174 is moved towards the right in FIG. 8 against the force of the spring 180, the follower pin 178 is raised, as a result of which the occluding flap 70 is tilted in the clockwise direction in FIG. 8. The corresponding position of the driving mechanism is shown in FIG. 9.

Figure 9:
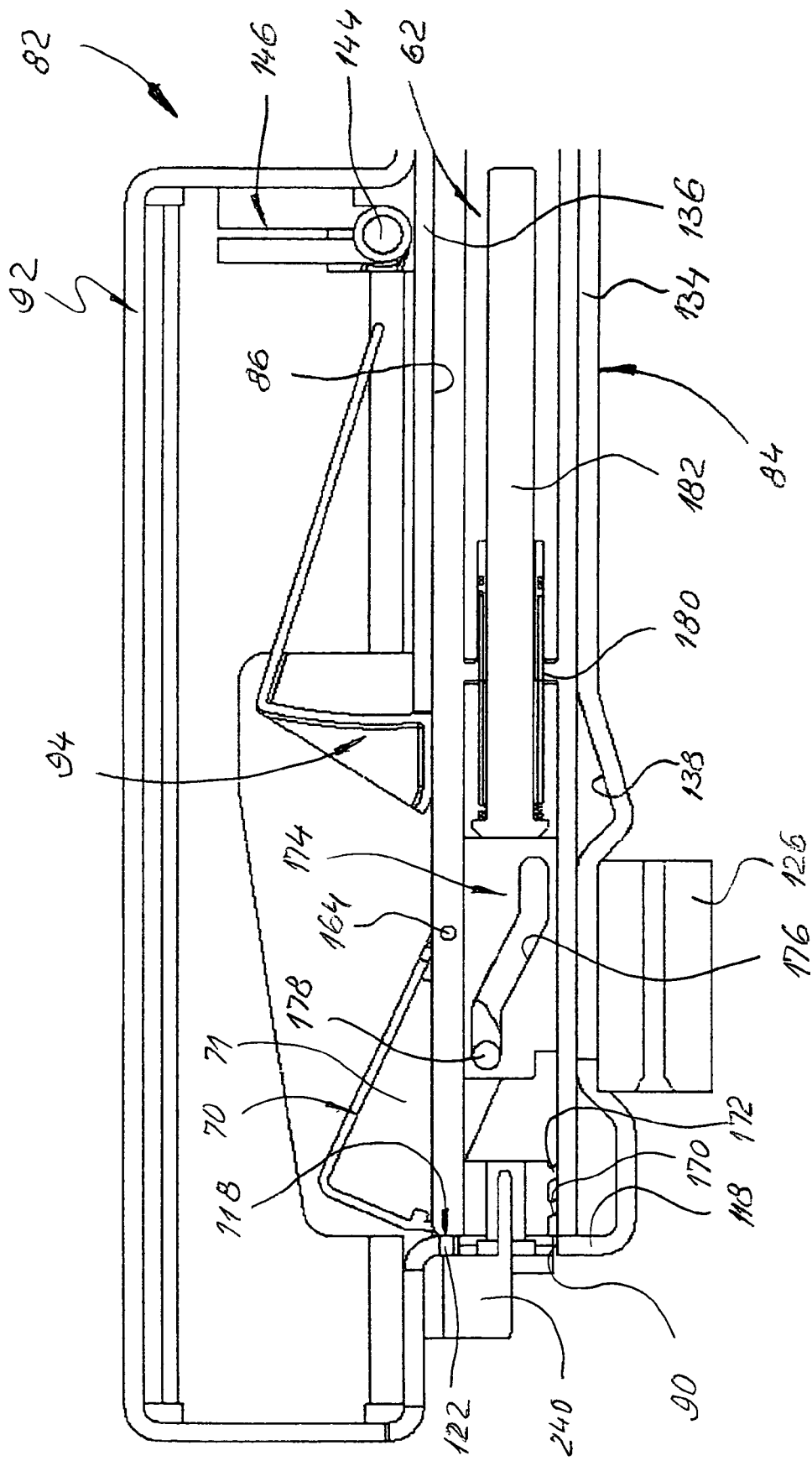
FIG. 9: shows a view similar to FIG. 8, in which, however, the cassette has been moved completely into its end position.

The moving of the control member 174 from the position shown in FIG. 8 into the position shown in FIG. 9 takes place by means of an actuating pin 184 which is stationary in the direction of movement and is part of the transfer unit 82.

As can be seen from FIGS. 11 and 12, an actuating pin for a very large cassette can be supported in a simple manner on the frame of the transfer unit, as is represented at 184G.

A stop pin 184M for a medium-sized cassette is carried by a supporting leaf 186M which is tiltably mounted on a spindle 188M which is integral with the frame.

The location of the spindle 188M and the radial dimension of the supporting leaf 186M are chosen in such a way that said supporting leaf 186M extends obliquely downwards, as represented in FIG. 11, when no cassette is close to it.

In a similar way, another actuating pin 184K is arranged in a tiltable manner on a spindle 188K via a supporting leaf 186K. The above remarks apply mutatis mutandis.

The supporting leaves 186M and 186K are each tilted out of the position which slopes down obliquely and in which their actuating pin 184 projects into the path of the cassette, and into a raised position in which the actuating pin !842 lies above the path of the cassette, when a cassette is inserted and raises the covering members 94 or 94 and 96 which are located in its path.

FIG. 11 shows a location of the actuating pins and supporting leaves such as is obtained when a medium-sized cassette 62M is inserted: The supporting leaf 186K and the actuating pin 184K are raised, the supporting leaf 186M and the actuating pin 184M it carries still project into the path of the cassette 62M and have swivelled the occluding flap 70 outwards when said cassette was pushed forwards.

If a cassette 62K having a smaller width is inserted, the conditions shown in FIG. 12 are obtained. The supporting leaf 186K is now also positioned with its actuating pin 184K in the lower working position, and said actuating pin 184K has opened the occluding flap 70 of the smaller cassette 82.

If use is made of a cassette having a large dimension, the supporting leaves 186K and 186M are both raised, so that both the actuating pins 184K and 184M remain out of action. The large cassette is then opened using the stationary actuating pin 184G.

In FIG. 14, a scanner for reading exposed storage films is designated, as a whole, by 200. It has a frame 208 which is formed from two end plates 202, 204 and bars 206 which connect the said plates.

The said frame carries two transfer units 82-1 and 82-2, such as have been described above, which lie one above the other in an aligned manner. Where a distinction is to be made below between components of these units, this will be done in like manner by adding "-1" or "-2".

The lower end plate 202 carries a reading head which is designated, as a whole, by 210 and which may have the same construction as is described in WO 01/18796 A1. The content of the latter should be referred to, as also being the content of the present application.

By means of a revolving mirror, the reading head 210 generates a revolving laser beam 212, by means of which the excited centres of the working coating 14 of a storage film 10 can be excited in order to emit fluorescent light. The fluorescent light obtained in this way is detected by means of a photomultiplier which has a large diameter and is arranged in the interior of the reading head 210 and of which no further details are shown here.

The reading head 210 has a cylindrical housing which is designated by 214 and has an annular gap 216 through which the laser beam 212 emerges.

In order to be able to move a storage film over the annular gap 216 in a cylindrically curved geometry, a clamping carriage which is designated, as a whole, by 218 is provided. Said carriage is displaceable on the bars 206 and can be adjusted in the direction which is the vertical direction in FIG. 14, by means of a threaded spindle 220 which is acted upon by a motor 222.

Said motor 222 cooperates with a position-indicator 224. An angle-indicator which cooperates with the deflecting mirror is provided in the interior of the reading head 210, so that it is possible to determine, from the output signals from the said angle-indicator and from the position-indicator 224, the particular point on the storage film which is being scanned.

By recording the output signal from the photomultiplier and the output signals from the angle-indicator and the position-indicator 224, it is possible to obtain, in a connected analysing unit, an electronic copy of the latent X-ray image which has been obtained on the storage plate 10 by irradiating an object with X-rays.

In order to be able to bring the storage film 10 into an exactly cylindrical shape, spaced-apart plates 226, 227, 228 on the clamping carriage 218 which are connected by bars 225 each have an internally located, circular guide rail 230, 231 and 232 respectively, the profile of which exactly corresponds to that of the guide rails 74, 76, so that the guide parts 24 of the storage film 10 are held in like manner within said guide rails with close sliding clearance.

A transfer strip, which is designated, as a whole, by 234, cooperates with the transfer units 82, in each case, for the purpose of moving the storage films 10 out of the cassettes 62 and into the guide rails 230, 231, 232 of the clamping carriage 218.

At its end that lies at the front in the clockwise direction in FIG. 14, the said transfer strip carries a number of gripping strips 236 which are manufactured from leaf-spring-like material and have a hook section 238 at the free edge. As can be seen from FIG. 15, said hook section is capable, on approaching the profiled strip 44 of a storage film 10 on the sidepiece 54 of said profiled strip 44, of travelling upwards and over the sidepiece 52 of said profiled strip, and of engaging in the groove in the latter and, optionally, travelling into a window constructed in the sidepiece 52.

If the gripping strip 236 is now moved out of the cassette 62, the storage film 10 is withdrawn in a manner guided within the guide rails 74, 76. After a short travelling distance, the guide parts 24 then pass into aligned guide-transition pieces 240 which are carried by the frame of the transfer unit 82.

Said transition pieces 240 have, once again, the same profile as the guide rails 74, 76 on the one hand, and as the guide rails 230, 231, 232 on the other. The end of the transition pieces 140 which is located on the left in FIG. 15 terminates in an aligned manner a short distance, in each case, in front of the opposite end of the associated, curved guide rail 230, 231 or 232 respectively.

At their ends on the cassette side, the guide-transition pieces 240 have a reduced height (the base of the C is removed), so that there are obtained at that point only two thin guide webs which correspond to the flanges of the C-shaped rail and protrude, like the tines of a fork, from that section of the transition pieces 240 which is located on the left in the drawing and has a full C-shaped profile.

The transfer strip 234 is carried by a driving arm 242 carried by a shaft 244 which is arranged on the axis of the reading head 210 and is mounted in a clip 246 which is integral with the frame, as can be seen clearly in FIG. 14 in the case of the upper transfer unit 82-2. The transfer strip 234-1 for the lower transfer unit 82-1 is mounted on the lower end in a similar manner, although this is not clearly visible from the drawing.

A driving motor 248, which is only shown diagrammatically in outline in FIG. 14, is provided for turning the shaft 244.

Figure 15:
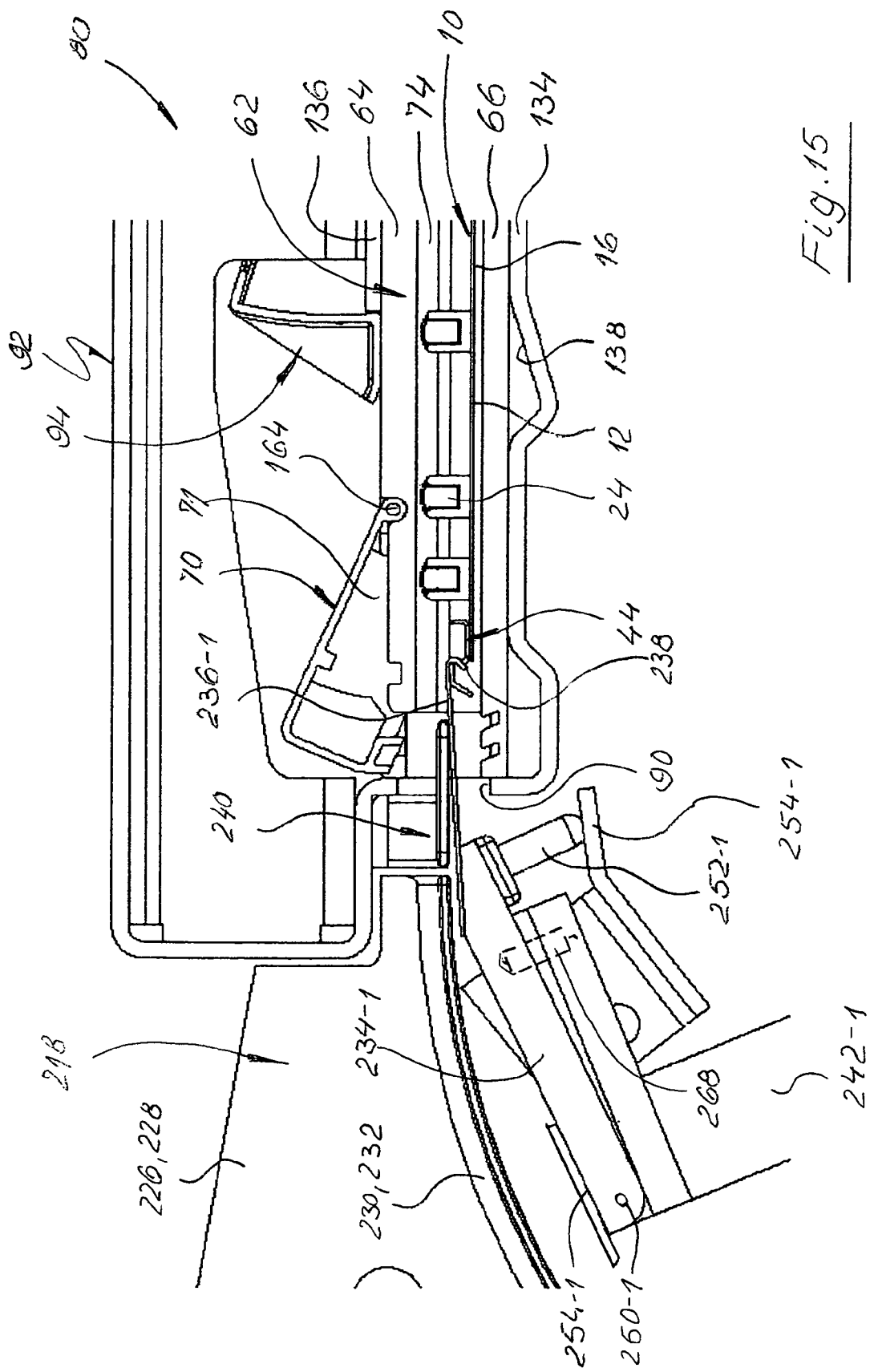
FIG. 15: shows an enlarged detail view of the outlet region of the receiving shaft and cassette, and also of a film-gripper, shown immediately after the connection of the film-gripper and the storage film.

As can readily be seen from FIG. 15, the gripping strip 236 has to perform different movements:

As long as the guide parts 24 of the storage film 10 are not yet cooperating with the curved guide rails 230, 231, 232, of the clamping carriage 218, the movement of the gripping strip 236 is to extend exactly parallel to the direction preset by the guide rails 74, 76.

On the other hand, as soon as the first guide parts 24 have run into the curved guide rails 230, 231, 232, the gripping strip 136 is to perform a circular movement.

In addition, it must be possible to move the gripping strip 236 out of engagement with the profiled rail 44 again, so that it is released from the clamping carriage 218 which is to be conveyed vertically.

In order to make this possible, the transfer strip 234 is mounted on the outer end of the driving arm 142 in a manner articulated by means of a pin 250. Said transfer strip 234 is pretensioned in the clockwise direction by a spring which is not represented in the drawing. This pretensioning is absorbed by the guide parts 24 and the guide rails 230, 231, 232 when the storage film 10 is running in said guide rails 230, 231, 232 by means of at least one set of guide parts 24.

If none of the guide parts 24 is in engagement with the guide rails 230, 231, 232, the transfer strip 234 is supported in the vicinity of the end wall 118 of the receiving shaft 84, via a follower pin 252 which is carried by said strip, on a cam face 254 which is carried by the frame of the scanner 200.

Said cam face 254 is shown in the form of a flat face; in this connection, however, it might also be a suitably curved face. The contour of the cam face 254 is generally chosen in such a way that, by superimposing that circular movement of the swivelling point of the transfer strip 234 which is made available by the driving arm 242 and that movement of the front end of the gripping strip 236 which is controlled by the cam face 254, a linear movement, as a whole, of the hook section 238 within the plane of movement of the profiled rails 44 is obtained, when the storage film is guided by the guide rails 74, 76 of the cassette 62.

Figure 16:
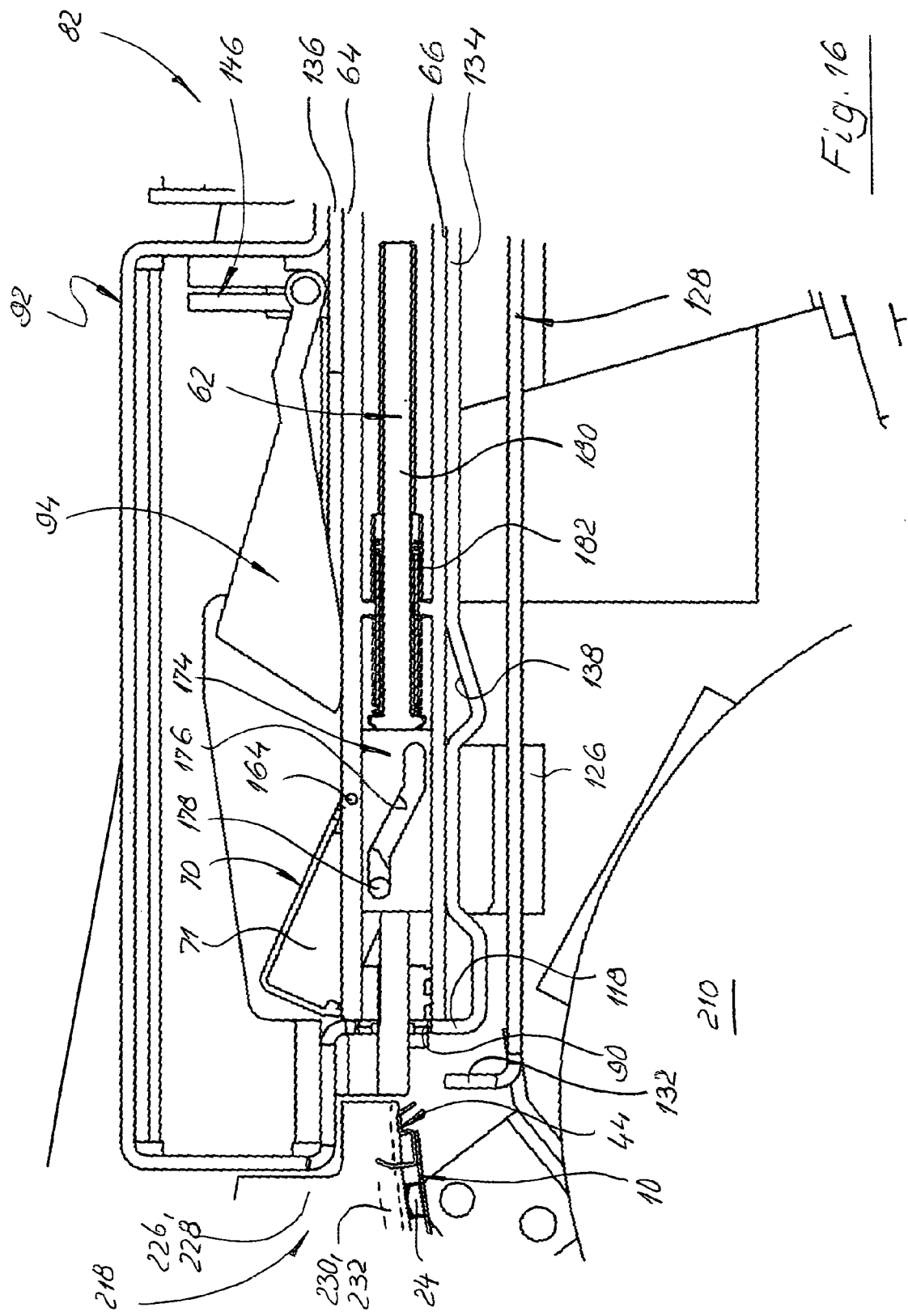
FIG. 16: shows a view similar to FIG. 15, but wherein the film has now already been moved completely out of the cassette.

By moving the transfer strip 234 about a sufficiently large angle, a state is then reached in which the front end of the storage film 10 lies at the rear end of the guide rails 230, 231, 232, while the rear end of said storage film 10 lies, with its profiled rail 46, at the front end of said guide rails 230, 231, 232, as is represented in FIG. 16.

When the storage film 10 is in this position, it is bent in an exactly cylindrical manner in accordance with the curvature of the guide rails 230, 231, 232, and can be moved over the annular gap 216 at a small radial distance and be read by the laser beam 212 in the process.

Figure 17:
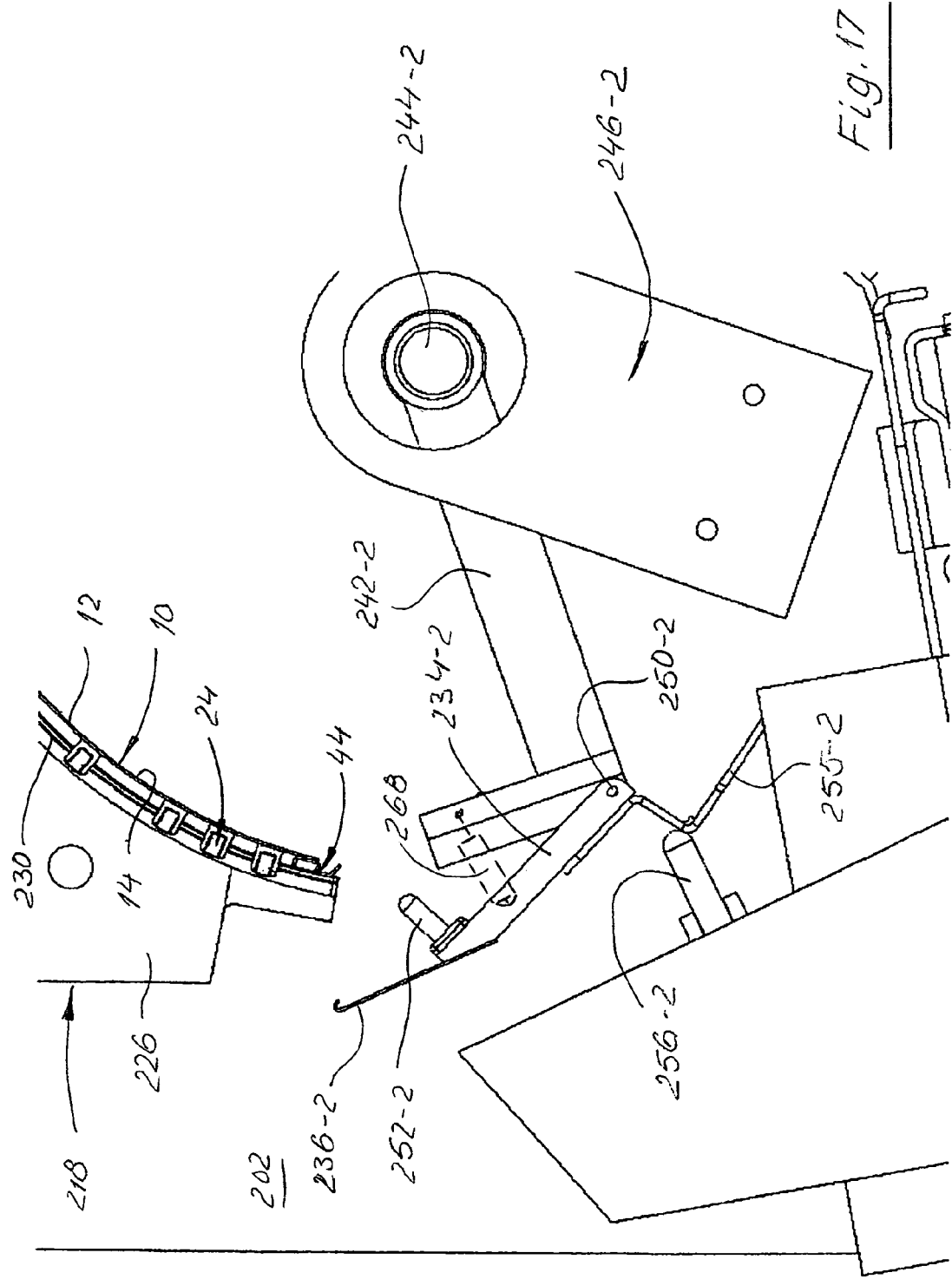
FIG. 17: shows a top view of the upper end of the reader, wherein a carriage carrying the storage film is represented in an abovementioned end position in which said storage film can be moved out of the clamping device and into an empty cassette, using a second gripper.

FIG. 17 shows the same situation at the other end of the guide rails 230, 231, 232. The transfer strip 234 is shown in a position in which it has disengaged itself from the profiled rail.

For this purpose, the transfer strip 234 carries a Z-shaped sheet-metal cam 254 which cooperates with a follower pin 256 integral with the frame in such a way the gripping strip 236 is tilted radially outwards when it reaches the rear end, which is shown in FIG. 17, of the guide rails 230, 231, 232.

The sheet-metal cam 254 is axially offset in relation to the guide rails 230, 231, 232 sufficiently for it not to touch said guide rails when the transfer strip 234 is tilted.

When the transfer strips 234-1 and 234-2 are in the position shown in FIG. 17, the clamping carriage 218 can be freely conveyed vertically.

In the space which is located above the reading head 210 and constitutes a continuation of the clear contour of the latter, there may be arranged a circular-disc-shaped erasing unit 258 which is shown diagrammatically in outline and which contains, for example, a fluorescent tube and an erasing-light filter surrounding the latter. Said unit has an outlet gap, which extends in the peripheral direction, for intensive erasing light.

Other wide-band light sources, such as, for example, halogen or xenon lamps in combination with suitable filters, or narrow-band light sources such as LED's without a filter, are also possible.

The erasing unit 258 is partitioned off, light-wise, from the reading head 210 by suitable means, for example a screen 260 (for erasing light and fluorescent light) which reaches to just in front of the working coating of the cylindrically arched storage film 10, or a suitable colour filter, so that no erasure by erasing light of regions of the storage film 10 that have not yet been read occurs. At the same time, it is guaranteed that no fluorescent light arising in the course of the erasing operation reaches the reading head 210 and falsifies the reading.

The entire reader and eraser described above is accommodated in a light-tight housing 262, to the interior of which there is access only via locks formed by the receiving shafts 84-1 and 84-2.

The upper transfer unit 82-2 is constructed, apart from the bearing arrangement of the transfer strip 234-2, in exactly the same way as has been described above in the case of the lower transfer unit 82-1.

After the storage film 10 has been read completely, the clamping carriage 218 is moved onwards again by a short distance until its guide rails 230, 231, 232 are at exactly the same height as the guide rails 74, 76 of an empty cassette 62-2 which is waiting in the upper transfer unit 82-2 with the occluding flap 70 open.

The storage film 10 is moved out of this position, which corresponds to the conditions according to FIG. 17, through the fact that the gripping strip 236-2 present at that point is directed radially towards the profiled rail 44 and sets the driving arm 242 in motion in the clockwise direction. The gripping strip 236-2 then pushes the erased storage film 10 back into the profiled rails 230, 231, 232.

The other end of the storage film 10 is then pushed, by means of the profiled rail 46 and the first guide parts 46 present at that point and via the guide-transition pieces 240, into the cassette 62-2, where the guide pieces 24 are received in the profiled rails 74, 76 which are present at that point.

After further rotation of the driving arm 42, a situation such as is represented in FIG. 5 is obtained. The storage film 10 has now been completely inserted in the empty cassette 62-3.

As a result of disengagement of the hook section 238 and slight backward conveyance of the driving arm 242, the gripping strip 236 is then moved out of the film-loading aperture 90. The cassette 62 can now be withdrawn, towards the right in the drawing, from the cassette-receiving shaft 84 of the upper transfer unit 82-2.

In the course of this movement, the control members 174 of the cassette are then released from the actuating pins 184 which are operative in the case of the particular cassette, and the occluding flap 70 is closed tightly again under the force of the spring 180.

The cassette 62, which is thus provided with an erased storage film 10 again, is now ready for taking a new X-ray.

As a result of the fact that the clamping carriage 218 is then conveyed back into its lower position again, the cycle described above can be repeated and an exposed storage film can be read and erased.

As a modification of the exemplified embodiment described above, it is also possible to provide, for a storage film, guide parts of a kind which are carried by two opposite edges of said film.

Figure 18:
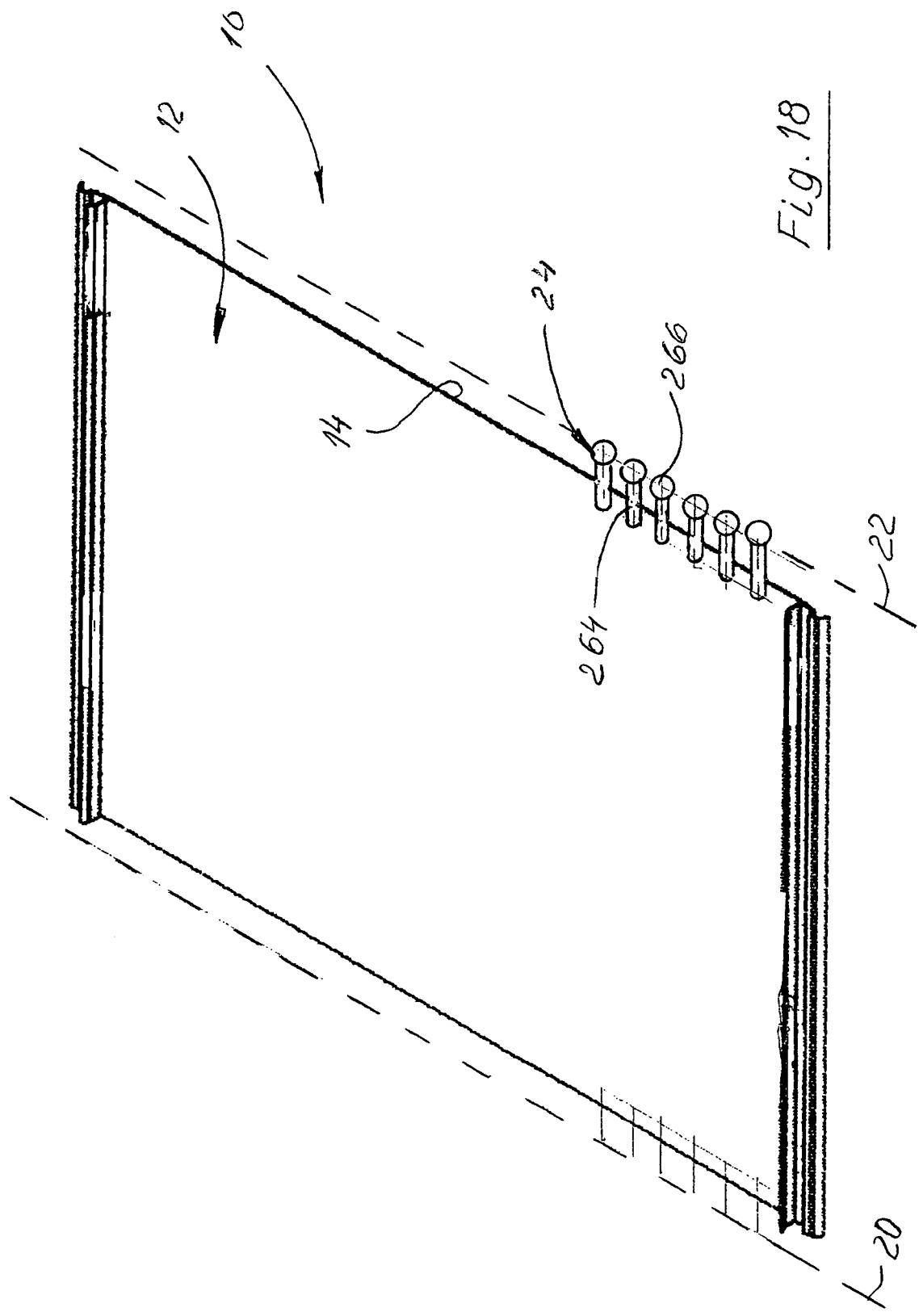
FIG. 18: shows a view similar to FIG. 1, wherein laterally arranged guide means for the film, are shown.

In the exemplified embodiment according to FIG. 18, the two longitudinal edges of the storage film 10 each carry guide parts 24 which have a peg section 264 which is fastened (for example bonded) to the edge of the film, and a spherical guide section 266 which is carried by said peg section. Obviously, the guide rails then have suitably adapted geometry and are arranged laterally outside the path of the storage film 10.

In the case of this geometry and attachment of the guide parts 24 too, it is guaranteed that the storage film cannot be damaged inside the cassette 62 or on the clamping carriage 218 or when transferred between the cassette and the clamping carriage. The guide parts 24 shown in FIG. 18 also guarantee that the ability of the film to bend into a cylindrical shape is maintained.

As a modification to the exemplified embodiment described above, use may be made, or may additionally be made, for the purpose of partitioning off the erasing light, of a circular sealing brush with radially oriented bristles, which cooperates with the storage film. In this case, it is then possible to provide, at those peripheral regions of the clamping carriage 218 which are not occupied by film material, covering walls which are arched in accordance with the curvature of the film and fill up the gaps and which then cooperate with the sealing brush at these points. It is also possible to provide a single covering wall of this kind, which is located behind the storage film (directly outside the latter, radially).

In a further modification of the invention, it is possible to replace the cam drives 252, 254 and 255, 256, which serve to generate a radial component of the movement of the gripping strip 236, by a controllable drive, for example by a linear motor 268 which operates between the transfer strip 234 and the driving arm 242 and which is shown in outline in broken lines in FIGS. 15 and 17.

Said linear motor 268 can then be activated in dependence upon the output signal of an angle-indicator 270 which interacts with the shaft of the driving motor 248, as is shown in FIG. 14.

It is then possible to bring the gripping strip 236 into or out of engagement with a profiled strip 44, 46 at any desired points on the guide rails 230, 231, 232. This makes it possible to draw a number of smaller storage films into the guide rails 230, 231, 232 of the clamping carriage in a contiguous manner, and to read them together. The separation coordination of the image signals with the individual images then takes place electronically in the analysing circuit, as is described in WO 01/18796 A1.

In yet another modification, it is possible to provide, instead of the erasing unit 258 which is coaxial with the reading head 210 or in addition to said unit, a bar-shaped erasing lamp in the vicinity of the film-loading aperture 90, in order to erase the storage films when they are pushed back into the cassette 62 again. This lamp is cut off electrically until the reading of the latent X-ray image has been completed.

It is again emphasized that the above-described embodiments of the present invention, particularly, any "preferred" embodiments, are possible examples of implementations merely set forth for a clear understanding of the principles of the invention. Many variations and modifications may be made to the above-described embodiments of the invention without substantially departing from the spirit and principles of the invention. All such modifications are intended to be included herein within the spirit of the invention and the scope of protection is only limited by the accompanying claims.

The invention claimed is:

1. A device for positioning a storage film which has a working side that responds to electromagnetic radiation and a rear side, comprising:
   at least one guide means arranged on the storage film along at least one guide line;
   wherein the at least one guide means maintains the ability of the storage film to bend in an axis which is inclined in relation to the at least one guide line and lies in the plane of the film;
   each of the guide means comprises at least three discrete guide parts which are attached to the storage film in a spaced-apart manner along the at least one guide line associated therewith; and,
   each of the guide means cooperates with an elongated guide rail which is rigid compared to the storage film.

2. The device of claim 1, wherein the discrete guide parts are manufactured from a material which is rigid compared to the storage film.

3. The device of claim 1, wherein the discrete guide parts have a substantially flat fastening face which is connected to the storage film in laminar contact.

4. The device of claim 1, wherein the discrete guide parts have two guide arms which are arranged symmetrically in relation to a central line and whose main direction of extension extends parallel to the plane of the film.

5. The device of claim 1, wherein a central section of the discrete guide parts is constructed as a hollow box part.

6. The device of claim 1, wherein boundary faces of the discrete guide parts, which boundary faces lie parallel to the plane of the film, are convexly curved.

7. The device of claim 1, wherein the free ends of the discrete guide parts have an arcuate marginal contour.

8. The device of claim 1, wherein the discrete guide parts have at least partially rotationally symmetrical guide sections.

9. The device of claim 1, wherein a distance between a first discrete guide part and an adjacent second discrete guide part at ends of the at least one guide line is smaller than within the at least one guide line.

10. The device of claim 1, wherein the storage film has ends that extend perpendicular to the at least one guide line, and wherein at least one end includes a profiled strip.

11. The device of claim 3, wherein the substantially flat fastening face is bonded to the storage film in laminar contact.

12. The device of claim 3, wherein the substantially flat fastening face is welded to the storage film in laminar contact.

13. A device for positioning a storage film which has a working side that responds to electromagnetic radiation and a rear side, comprising:
   at least one guide means arranged on the storage film along at least one guide line;
   wherein the at least one guide means maintains the ability of the storage film to bend in an axis which is inclined in relation to the at least one guide line and lies in the plane of the film;
   each of the guide means comprises discrete guide parts which are attached to the storage film in a spaced-apart manner along the at least one guide line associated therewith; and,
   each of the discrete guide parts includes a passage for receiving a portion of an elongated guide rail which is rigid compared to the storage film.

14. The device of claim 13, wherein the discrete guide parts are manufactured from a material which is rigid compared to the storage film.

15. The device of claim 13, wherein the discrete guide parts have a substantially flat fastening face which is connected to the storage film in laminar contact.

16. The device of claim 13, wherein the discrete guide parts have two guide arms which are arranged symmetrically in relation to a central line and whose main direction of extension extends parallel to the plane of the film.

17. The device of claim 13, wherein a central section of the discrete guide parts is constructed as a hollow box part.

18. The device of claim 13, wherein boundary faces of the discrete guide parts, which boundary faces lie parallel to the plane of the film, are convexly curved.

19. The device of claim 13, wherein the free ends of the discrete guide parts have an arcuate marginal contour.

20. The device of claim 13, wherein the discrete guide parts have at least partially rotationally symmetrical guide sections.

21. The device of claim 13, wherein a distance between a first discrete guide part and an adjacent second discrete guide part at ends of the at least one guide line is smaller than within the at least one guide line.

22. The device of claim 13, wherein the storage film has ends that extend perpendicular to the at least one guide line, and wherein at least one end includes a profiled strip.

23. The device of claim 15, wherein the substantially flat fastening face is bonded to the storage film in laminar contact.

24. The device of claim 15, wherein the substantially flat fastening face is welded to the storage film in laminar contact.

25. A device for positioning a storage film which has a working side that responds to electromagnetic radiation and a rear side, comprising:
at least two guide means, each guide means arranged on the storage film in a line, each line extending in a direction of travel;
wherein the at least two guide means maintain the ability of the storage film to bend in an axis which is inclined in relation to the lines and lies in the plane of the film;
each of the guide means comprises a plurality of discrete guide parts which are attached to the storage film in a spaced-apart manner along the lines associated therewith; and,
each of the discrete guide parts cooperates with an elongated guide rail which is rigid compared to the storage film and extends along the lines associated therewith.

26. The device of claim 25, wherein the discrete guide parts are manufactured from a material which is rigid compared to the storage film.

27. The device of claim 25, wherein the discrete guide parts have a substantially flat fastening face which is connected to the storage film in laminar contact.

28. The device of claim 25, wherein the discrete guide parts have two guide arms which are arranged symmetrically in relation to a central line and whose main direction of extension extends parallel to the plane of the film.

29. The device of claim 25, wherein a central section of the discrete guide parts is constructed as a hollow box part.

30. The device of claim 25, wherein boundary faces of the discrete guide parts, which boundary faces lie parallel to the plane of the film, are convexly curved.

31. The device of claim 25, wherein the free ends of the discrete guide parts have an arcuate marginal contour.

32. The device of claim 25, wherein the discrete guide parts have at least partially rotationally symmetrical guide sections.

33. The device of claim 25, wherein a distance between a first discrete guide part and an adjacent second discrete guide part at ends of the at least one guide line is smaller than within the at least one guide line.

34. The device of claim 25, wherein the storage film has ends that extend perpendicular to the at least one guide line, and wherein at least one end includes a profiled strip.

35. The device of claim 27, wherein the substantially flat fastening face is bonded to the storage film in laminar contact.

36. The device of claim 27, wherein the substantially flat fastening face is welded to the storage film in laminar contact.

37. An apparatus for reading a storage film, said apparatus comprising:
a positioning device comprising:
at least one guide means arranged on the storage film along at least one guide line;
wherein the at least one guide means maintains the ability of the storage film to bend in an axis which is inclined in relation the at least one guide line and lies in the plane of the film;
each of the guide means comprises at least three discrete guide parts which are attached to the storage film in a spaced-apart manner along the at least one guide line associated therewith; and,
each of the guide means cooperates with an elongated guide rail which is rigid compared to the storage film; and,
a reading head which generates a reading beam which is moved in a first direction;
a clamping device for clamping the storage film in a preset, fixed geometry; and
a feed device for generating a relative movement between the reading head and the clamping device in a second direction which is different from the first direction, and, wherein the elongated guide rail is part of the clamping device.

38. The apparatus of claim 37, wherein the elongated guide rail of the clamping device is arched in the shape of a circle.

39. The apparatus of claim 37, wherein the clamping device is displaceable along an axis of the reading head.

40. The apparatus of claim 39, wherein the reading head generates the reading beam revolving in a transverse plane, and contains a detection device for fluorescent light emitted by the storage film in regions that have been exposed by X-rays.

41. An apparatus for reading a storage film, said apparatus comprising:
a positioning device comprising:
at least one guide means arranged on the storage film along at least one guide line;
wherein the at least one guide means maintains the ability of the storage film to bend in an axis which is inclined in relation the at least one guide line and lies in the plane of the film;
each of the guide means comprises discrete guide parts which are attached to the storage film in a spaced-apart manner along the at least one guide line associated therewith; and,
each of the discrete guide parts includes a passage for receiving a portion of an elongated guide rail which is rigid compared to the storage film; and,
a reading head which generates a reading beam which is moved in a first direction;
a clamping device for clamping the storage film in a preset, fixed geometry; and
a feed device for generating a relative movement between the reading head and the clamping device in a second direction which is different from the first direction, and, wherein the elongated guide rail is part of the clamping device.

42. The apparatus of claim 41, wherein the elongated guide rail of the clamping device is arched in the shape of a circle.

43. The apparatus of claim 41, wherein the clamping device is displaceable along an axis of the reading head.

44. The apparatus of claim 43, wherein the reading head generates the reading beam revolving in a transverse plane, and contains a detection device for fluorescent light emitted by the storage film in regions that have been exposed by X-rays.

45. An apparatus for reading a storage film, said apparatus comprising:
   a positioning device comprising:
      at least two guide means, each guide means arranged on the storage film in aline, each line extending in a direction of travel;
      wherein the at least two guide means maintain the ability of the storage film to bend in an axis which is inclined in relation the at least one guide line and lies in the plane of the film;
      each of the guide means comprises a plurality of discrete guide parts which are attached to the storage film in a spaced-apart manner along the lines associated therewith; and,
      each of the guide parts cooperates with an elongated guide rail which is rigid compared to the storage film; and,
   a reading head which generates a reading beam which is moved in a first direction;
   a clamping device for clamping the storage film in a preset, fixed geometry; and
   a feed device for generating a relative movement between the reading head and the clamping device in a second direction which is different from the first direction, and, wherein the elongated guide rail is part of the clamping device.

46. The apparatus of claim 45, wherein the elongated guide rail of the clamping device is arched in the shape of a circle.

47. The apparatus of claim 45, wherein the clamping device is displaceable along an axis of the reading head.

48. The apparatus of claim 47, wherein the reading head generates the reading beam revolving in a transverse plane, and contains a detection device for fluorescent light emitted by the storage film in regions that have been exposed by X-rays.

49. A cassette for receiving a storage film, comprising:
   a positioning device comprising:
      at least one guide means arranged on the storage film along at least one guide line;
      wherein the at least one guide means maintains the ability of the storage film to bend in an axis which is inclined in relation the at least one guide line and lies in the plane of the film;
      each of the guide means comprise discrete guide parts which are attached to the storage film in a spaced-apart manner along the at least one guide line; and,
      each of the guide means cooperates with an elongated guide rail which is rigid compared to the storage film; and,
   wherein the elongated guide rail is carried by a wall of the cassette in such a way that the elongated guide rail extends perpendicularly to a plane of a loading aperture.

50. The cassette of claim 49, wherein the elongated guide rail is carried by a main wall in such a way that the working side of the storage film is spaced apart from an other main wall that lies opposite the aforesaid main wall.

51. The cassette of claim 50, wherein the main wall or the other main wall that lies opposite the latter is provided with entraining means upon which thrust means act.

52. The cassette of claim 49, further comprising an occluding flap which is movable between a position that occludes the loading aperture in a light-tight manner and a position that unblocks said loading aperture.

53. A device for bringing about a transfer of a storage film between a cassette for receiving the storage film and an apparatus for reading a storage film, the device comprising:
   a positioning device comprising:
      at least one guide means arranged on the storage film along at least one guide line;
      wherein the at least one guide means maintains the ability of the storage film to bend in an axis which is inclined in relation the at least one guide line and lies in the plane of the film;
      each of the guide means comprise discrete guide parts which are attached to the storage film in a spaced-apart manner along the at least one guide line; and,
      each of the guide means cooperates with an elongated guide rail which is rigid compared to the storage film; and,
   wherein the elongated guide rail is carried by a wall of the cassette in such a way that the elongated guide rail extends perpendicularly to a plane of a loading aperture;
   wherein the cassette includes an occluding flap which is movable between a position that occludes the loading aperture in a light-tight manner and a position that unblocks the loading aperture;
   wherein the apparatus for reading a storage film comprises:
      positioning means comprising:
         at least one guide means arranged on the storage film along at least one guide line;
         wherein the at least one guide means maintains the ability of the storage film to bend in an axis which is inclined in relation to the at least one guide line and lies in the plane of the storage film, and,
         wherein each of the guide means comprise discrete guide parts which are attached to the storage film in a spaced-apart manner along the at least one guide line;
         each of the guide means cooperating with an elongated guide rail which is rigid compared to the storage film;
      a reading head which generates a reading beam which is moved in a first direction;
      a clamping device for clamping the storage film in a preset, fixed geometry; and,
      a feed device for generating a relative movement between the reading head and the claiming device in a second direction which is different from the first direction,
   wherein the elongated guide rail is part of the clamping device; and,
   a receiving shaft for the cassette;
   an actuating mechanism for the occluding flap of the cassette, which works when the cassette is inserted in the receiving shaft; and
   a gripper which is movable into and out of the loading aperture of the cassette and which acts upon the storage film, and wherein the gripper has a gripping strip which is capable of pulling and pushing with a profiled strip of the storage film.

54. The device of claim 53, wherein the gripping strip is constructed as an angled profile which has a hook section which is capable of engaging in the profiled strip.

55. The device of claim 54, wherein the gripping strip is arranged on a carrier strip which is tillable about an axis which is perpendicular to the elongated guide rail and parallel to a plane of the storage film.

56. The device of claim 53, wherein the gripper is carried by a driving arm which is rotatable about an axis of the reading head.

57. The device of claim 56, wherein the gripper is connected to a cam-follower which interacts with a spatially fixed cam face in such a way that the gripper is moved substantially parallel to the elongated guide rail of said cassette.

58. The device of claim 53, further comprising a plurality of independently actuatable covering members which lie side by side and each is movable-via an associated positioning lever which is driven by an inserted cassette, said covering members being capable, together, of completely occluding the cassette-receiving compartment when no cassette is located therein and, when cassettes of different size are used, of occluding those regions of said cassette-receiving compartment which are not filled up by the cassettes.

59. The device of claim 53, wherein at least one stop is provided, which is stationary in a direction of movement of the cassette and which cooperates, in a last phase of a movement of insertion of the cassette, with an input part of the occluding-flap actuating mechanism, the aforesaid stop being movable between a working position which is in alignment with the input part of the actuating mechanism, and an inoperative position which is remote from said working position.

60. The device of claim 53, wherein the receiving shaft has an end-position stop for a fully inserted position of the cassette, which end-position stop is passed over by the storage film, the device further including at least one stop that is stationary in a direction of movement of the cassette and which cooperates, in a last phase of a movement of insertion of the cassette, with an input part of the occluding-flap-actuating mechanism, the at least one stop being movable between a working position that is in alignment with the input part of the actuating mechanism and an inoperative position which is remote from the working position, wherein the receiving shaft has an additional stop which is shifted between the working position, in which it is positioned in front of the end-position stop and stops the cassette at a point at which the actuating mechanism for the occluding flap of said cassette has not yet operated, and an inoperative position that lies behind said end-position stop.

61. The device of claim 60, wherein the additional stop is coupled to thrust means which act upon the cassette.

62. The device of claim 53, wherein transition pieces are arranged between the elongated guide rail of the device for positioning the storage film and elongated guide rail of the cassette located in the receiving shaft.

63. The device of claim 62, wherein the transition pieces are reduced to their carrying flange on a cassette side, so that said transition pieces have a fork-like shape.

64. The device of claim 53, further comprising a second receiving shaft which lies side by side in an aligned manner with the receiving shaft, and the second receiving shaft including a second gripper, which is movable independent of the gripper.

65. The device of claim 64, wherein the reading head is substantially in alignment, in axial extension, with a first shaft of the receiving shafts, while a film-erasing device is provided in a space which is axially in alignment with the second shaft of the receiving shafts.

66. The device of claim 65, wherein a barrier which is impermeable to erasing light is provided between the film-erasing device and the reading head.

67. The device of claim 66, wherein the barrier is also impermeable to fluorescent light.

68. The device of claim 53, wherein a drive is provided for generating an additional movement of the gripper in a direction which is inclined in relation to a direction of the at least one guide rail.

* * * * *